Figure 1:
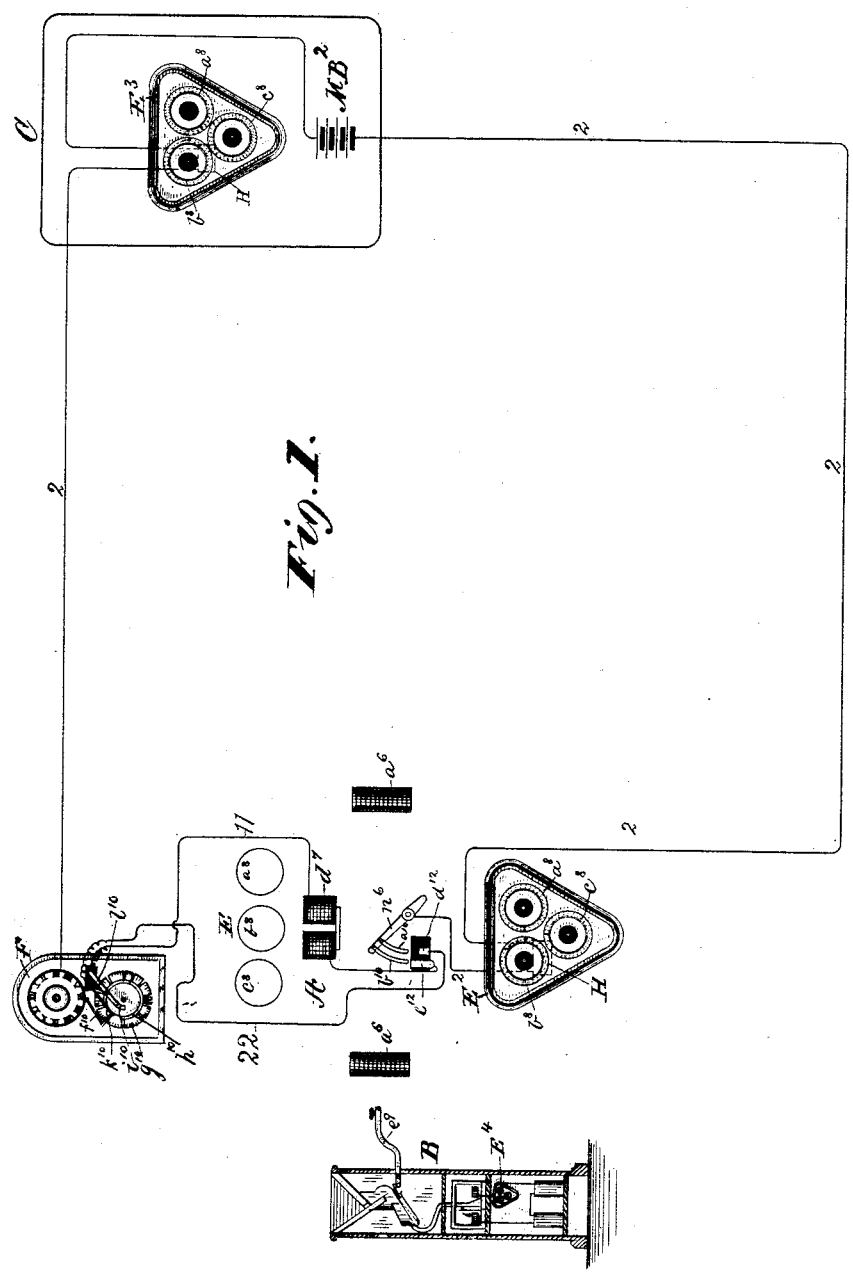

(No Model.) 14 Sheets—Sheet 1.

J. H. GUEST.
CHECK OR TICKET REGISTER APPARATUS.

No. 349,710. Patented Sept. 28, 1886.

WITNESSES:
Gabriel J. W. Galster
Wm. H. Capel

INVENTOR
J. H. Guest
BY
H. C. Townsend
ATTORNEY

N. PETERS, Photo-Lithographer, Washington, D. C.

(No Model.) 14 Sheets—Sheet 2.

J. H. GUEST.
CHECK OR TICKET REGISTER APPARATUS.

No. 349,710. Patented Sept. 28, 1886.

WITNESSES:
Gabriel J. W. Galster
Wm. H. Capel

INVENTOR
J. H. Guest
BY H. b. Townsend
ATTORNEY (No Model.) 14 Sheets—Sheet 3.
J. H. GUEST.
CHECK OR TICKET REGISTER APPARATUS.
No. 349,710. Patented Sept. 28, 1886.

WITNESSES:
Gabriel J. W. Bolster.
Wm. H. Capel.

INVENTOR
J. H. Guest.
BY
H. C. Townsend
ATTORNEY (No Model.)  14 Sheets—Sheet 4.
J. H. GUEST.
CHECK OR TICKET REGISTER APPARATUS.
No. 349,710. Patented Sept. 28, 1886.
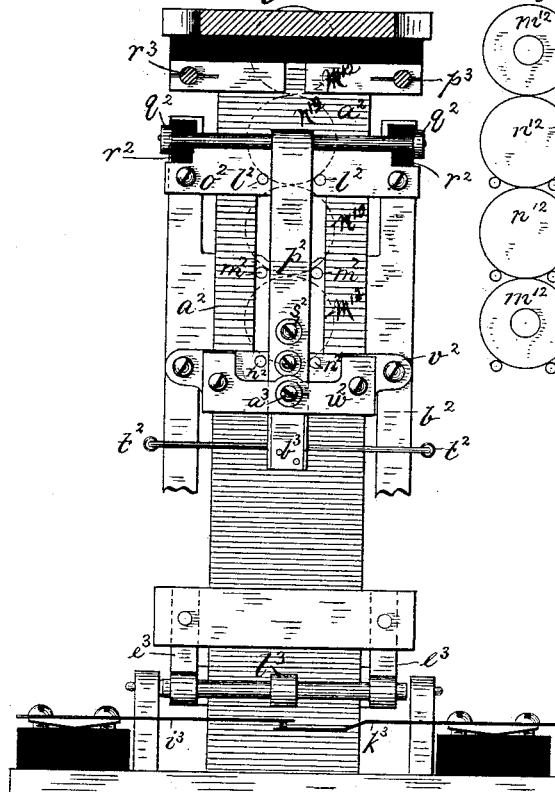
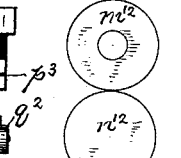
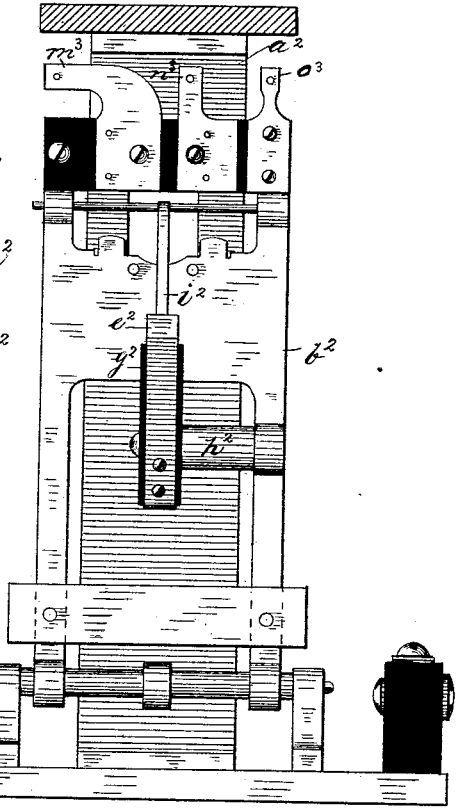
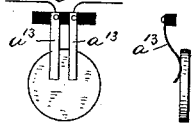
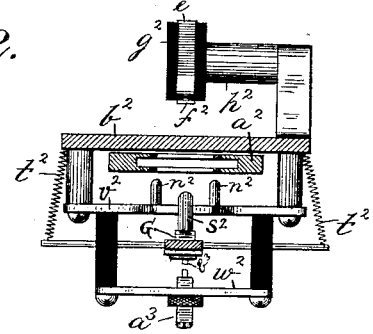
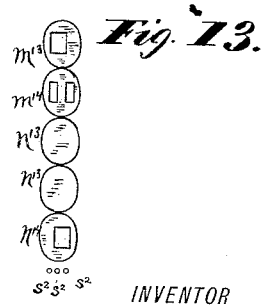
WITNESSES
INVENTOR
By Attorney (No Model.) 14 Sheets—Sheet 5.
J. H. GUEST.
CHECK OR TICKET REGISTER APPARATUS.
No. 349,710. Patented Sept. 28, 1886.
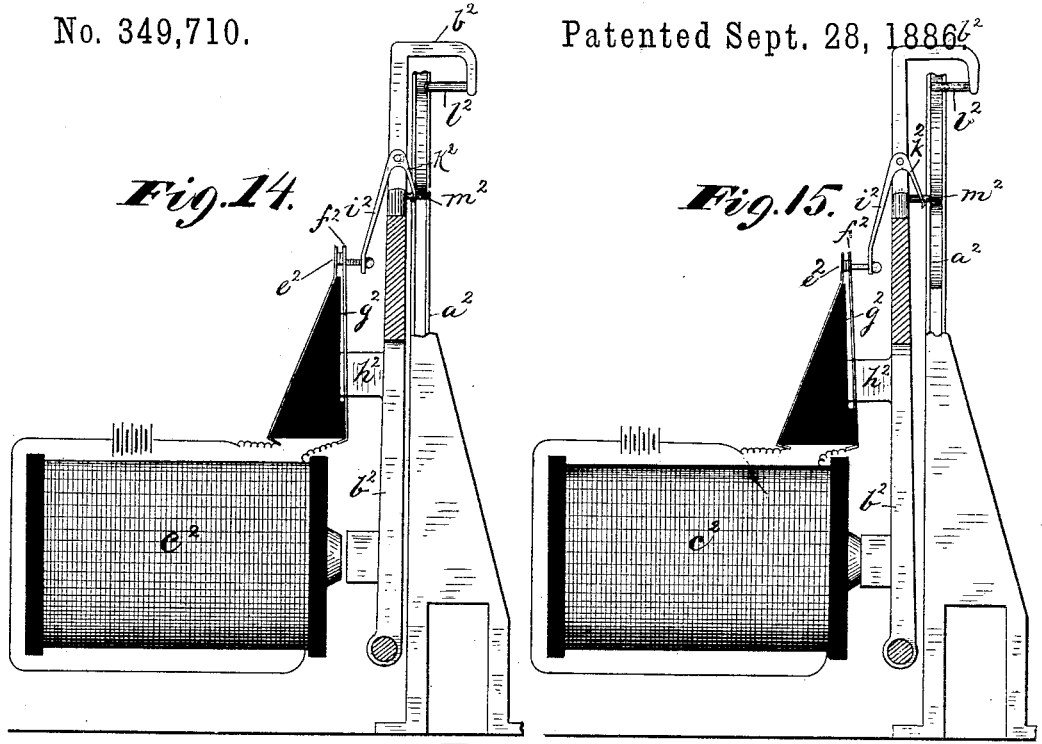
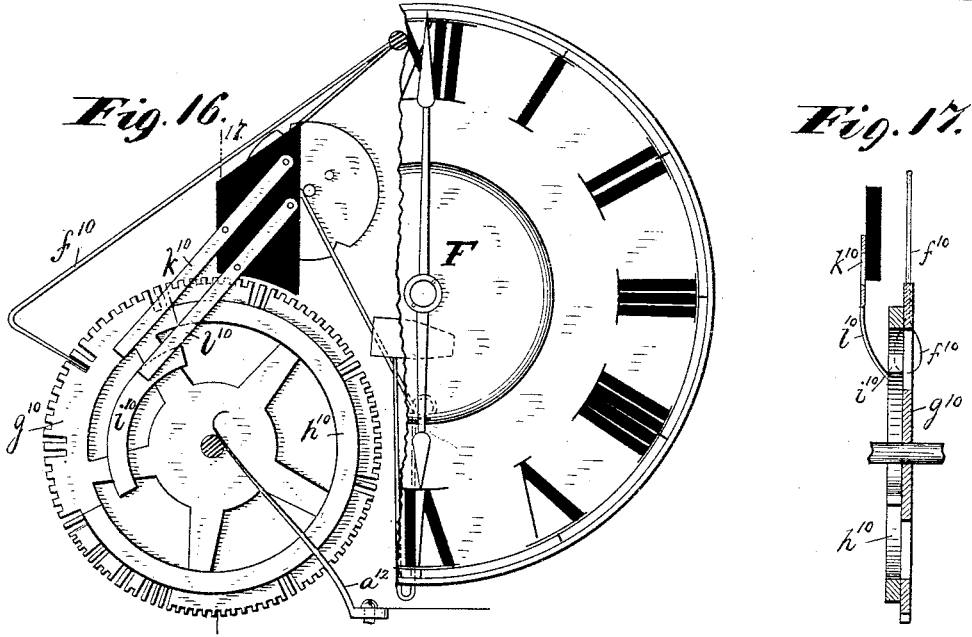
WITNESSES:
Gabriel J. W. Galster
Wm. H. Capel
INVENTOR
J. H. Guest
BY
H. C. Townsend
ATTORNEY (No Model.) 14 Sheets—Sheet 6.
J. H. GUEST.
CHECK OR TICKET REGISTER APPARATUS.
No. 349,710. Patented Sept. 28, 1886.
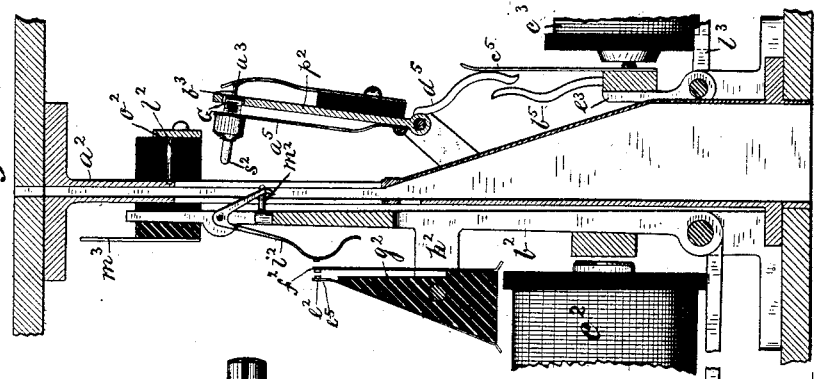
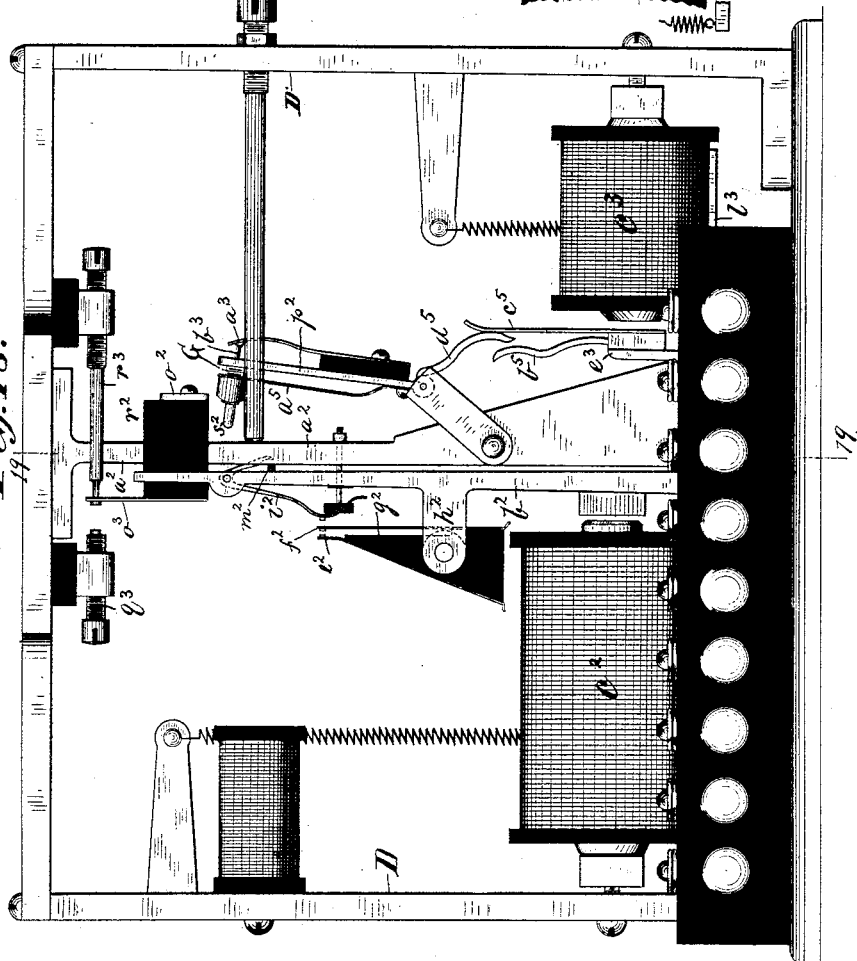
WITNESSES:
Gabriel J. W. Golder.
Wm. H. Capel
INVENTOR
J. H. Guest.
BY
H. C. Townsend.
ATTORNEY
N. PETERS. Photo-Lithographer. Washington, D. C.

(No Model.) 14 Sheets—Sheet 7.

J. H. GUEST.
CHECK OR TICKET REGISTER APPARATUS.

No. 349,710. Patented Sept. 28, 1886.

WITNESSES:
Gabriel J. W. Galster
Wm. H. Capel

INVENTOR
J. H. Guest
BY H. C. Townsend
ATTORNEY (No Model.)  
14 Sheets—Sheet 9.

J. H. GUEST.
CHECK OR TICKET REGISTER APPARATUS.

No. 349,710.  Patented Sept. 28, 1886.

WITNESSES:  
Gabriel J. W. Galster  
Wm. H. Capel

INVENTOR  
J. H. Guest  
BY  
H. C. Townsend  
ATTORNEY (No Model.) 14 Sheets—Sheet 10.
J. H. GUEST.
CHECK OR TICKET REGISTER APPARATUS.
No. 349,710. Patented Sept. 28, 1886.
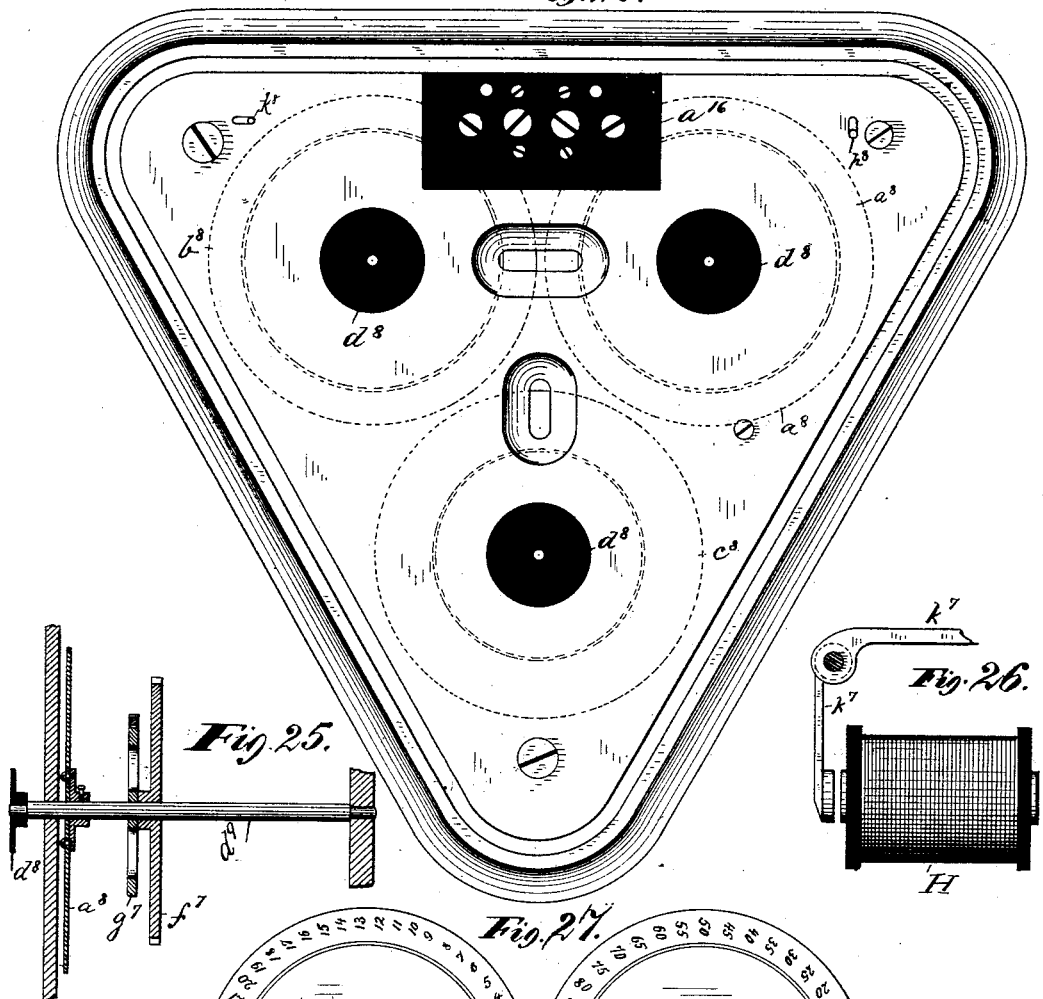
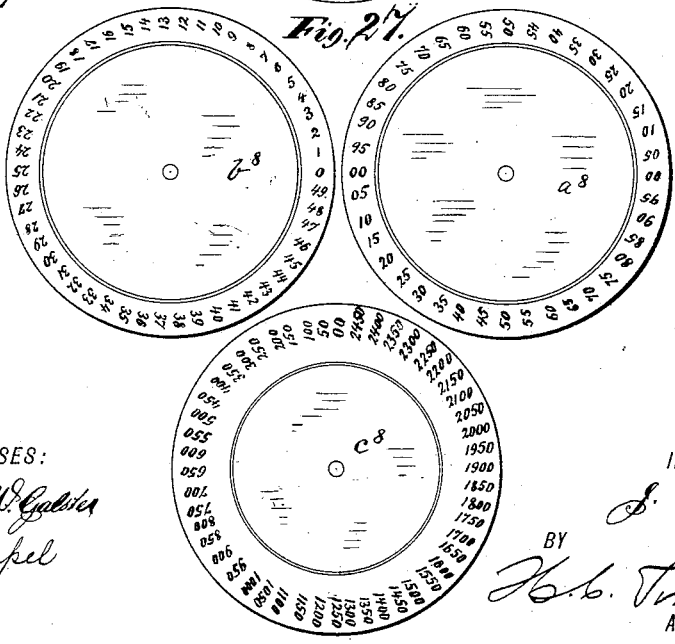
WITNESSES:
Gabriel J. W. Galilei
Wm H. Capel
INVENTOR
J. H. Guest.
BY
H. C. Townsend
ATTORNEY
N. PETERS, Photo-Lithographer, Washington, D. C.

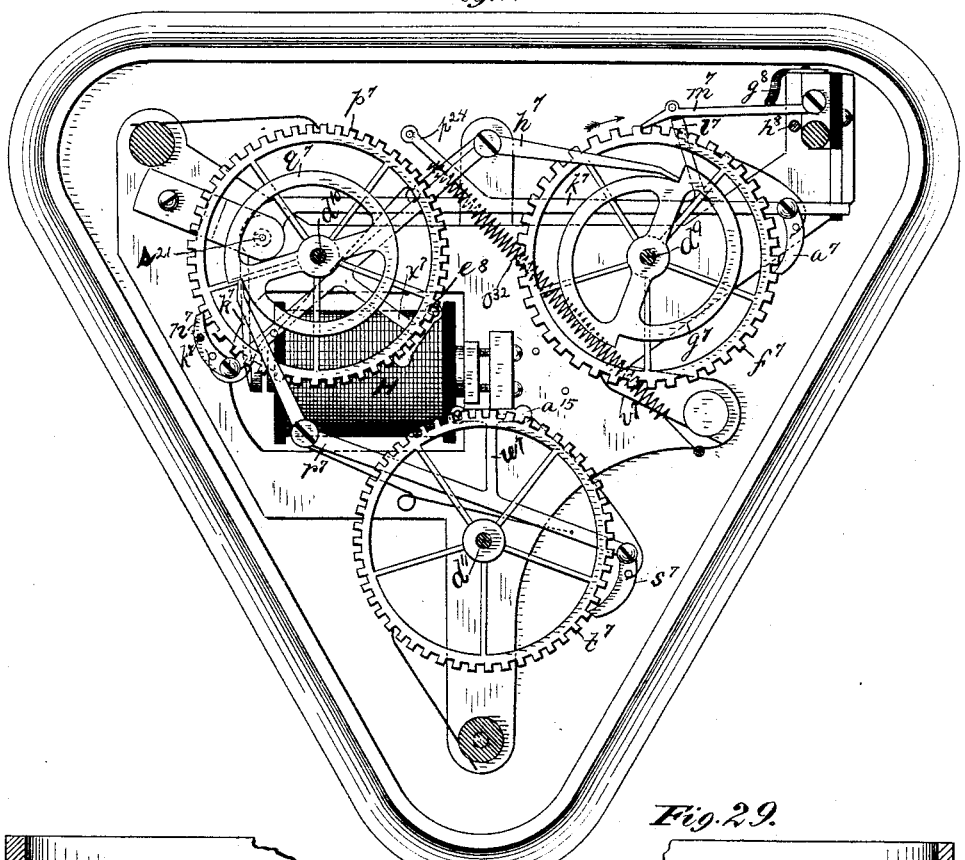

(No Model.) 14 Sheets—Sheet 12.

J. H. GUEST.
CHECK OR TICKET REGISTER APPARATUS.

No. 349,710. Patented Sept. 28, 1886.

WITNESSES:
Gabriel J. W. Calote
Wm. H. Capel

INVENTOR
J. H. Guest
BY
H. C. Townsend
ATTORNEY

N. PETERS, Photo-Lithographer, Washington, D. C.

(No Model.) 14 Sheets—Sheet 13.
J. H. GUEST.
CHECK OR TICKET REGISTER APPARATUS.
No. 349,710. Patented Sept. 28, 1886.
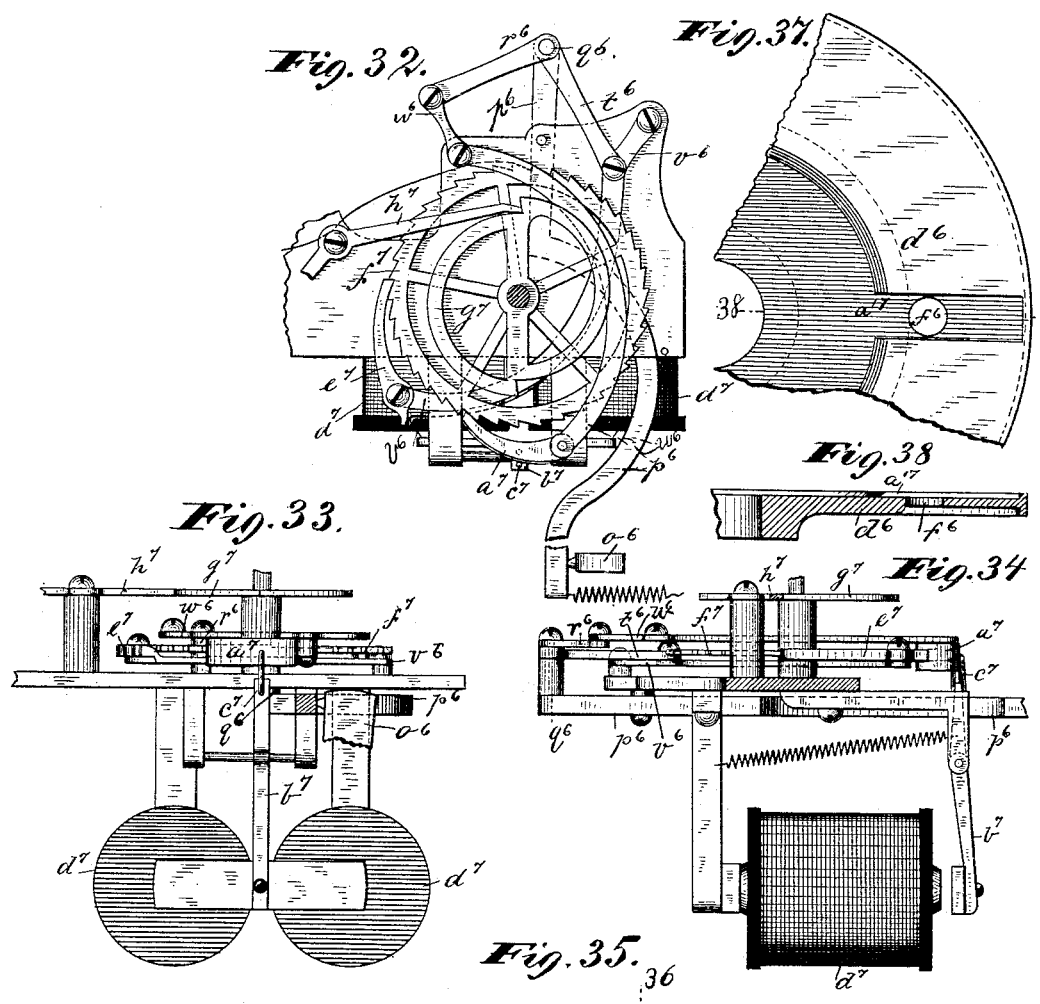

(No Model.)  14 Sheets—Sheet 14.
J. H. GUEST.
CHECK OR TICKET REGISTER APPARATUS.
No. 349,710. Patented Sept. 28, 1886.
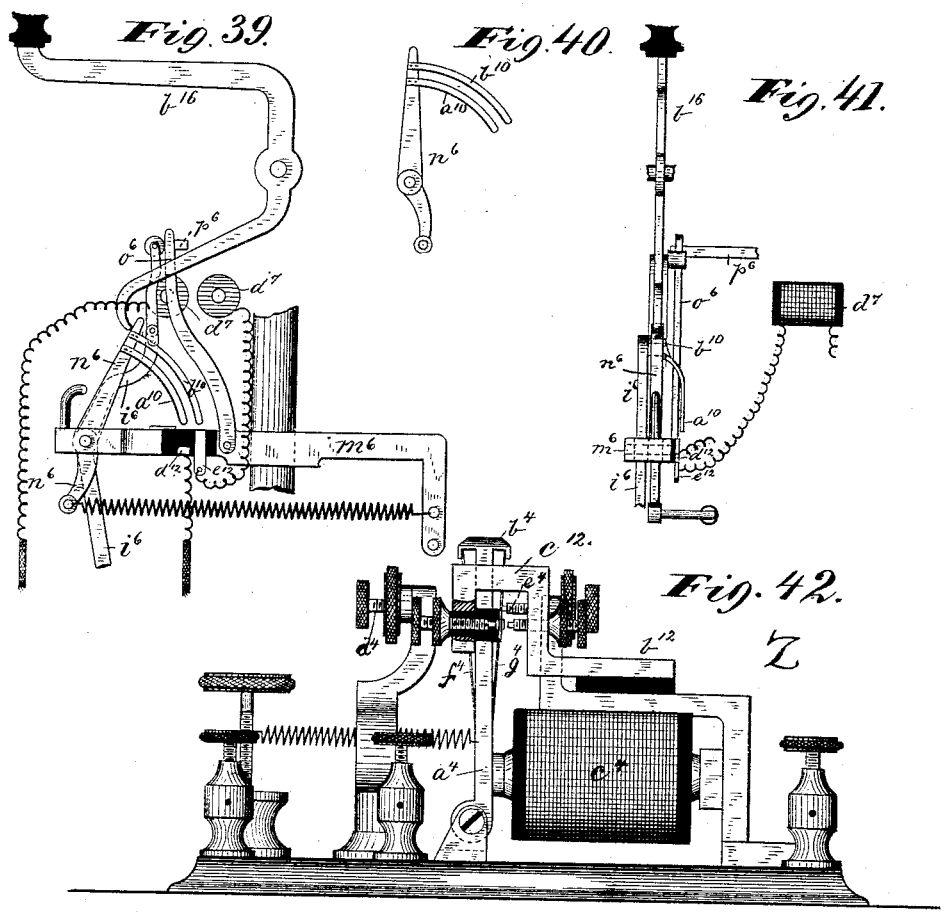
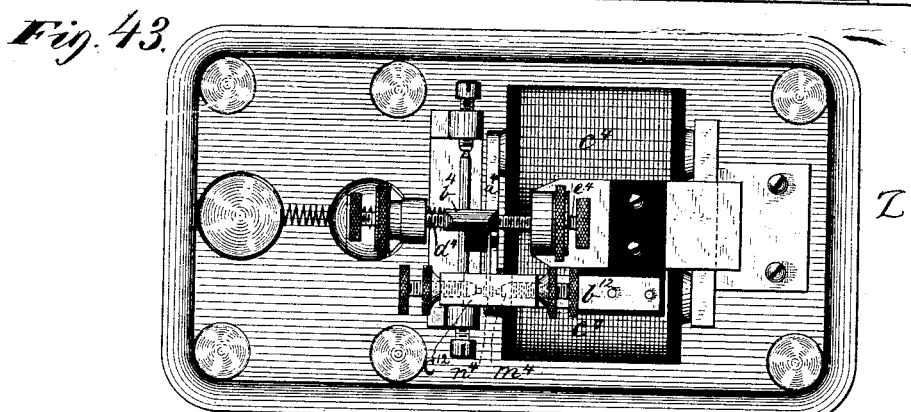

UNITED STATES PATENT OFFICE.

JOHN H. GUEST, OF BROOKLYN, ASSIGNOR OF ONE-HALF TO T. FRED THOMAS, OF NEW YORK, N. Y.

CHECK OR TICKET REGISTER APPARATUS.

SPECIFICATION forming part of Letters Patent No. 349,710, dated September 28, 1886.

Application filed February 23, 1886. Serial No. 192,966. (No model.)

*To all whom it may concern:*

Be it known that I, JOHN H. GUEST, a citizen of the United States, and a resident of Brooklyn, in the county of Kings and State of New York, have invented a certain new and useful Check or Ticket Register Apparatus, of which the following is a specification.

My invention relates to apparatus and combinations of apparatus, the primary object of which is to prevent fraud and peculation on the part of employés holding positions of trust—such, for instance, as ticket-sellers of railways and places of amusement, bar-keepers, employés in stores, and others.

My invention, like some others of a similar nature having the same general object in view, involves the employment of checks, tokens, tickets, or other evidences of value, which may be employed in commercial operations in large stores, in bar-rooms, or restaurants, in connection with the settlement of bills, or as tokens of the right to enter places of amusement, railway structures, such as elevated railways or other inclosures.

The invention is especially designed for use in elevated or other railway systems in which passengers are given access to the railway-platforms after the purchase of a ticket or other token and the depositing of the same in a suitable box, though other applications of the apparatus will suggest themselves.

Some of the special devices or apparatus may be omitted without seriously impairing the value of the apparatus as a means of preventing peculations and fraud.

In its best form my invention involves the employment, in combination, of three sets of apparatus, all conspiring to most effectually accomplish the end in view.

I will describe the invention having reference more particularly to its application to elevated railroads for passenger traffic, since by so doing I shall give an illustration of its adaptabilities which will be the more readily comprehended, and from which the capacity of the apparatus for use in other situations will be readily appreciated.

The three sets of apparatus consist of what I shall call a "check or ticket delivery apparatus," a "check-receiving apparatus," and a "central or supervising station" register.

The receiving apparatus at the central station is shown in the form of a "register," and will be so designated throughout the specification; but it would manifestly be no substantial departure from the principle of my invention to substitute for the register or combine with it an apparatus whereby the operations of my apparatus as a whole might be permanently recorded, and so preserved for future inspection or comparison. The term "checks" is to be taken as meaning and including any evidence of value, whether the same be a check, so called, of metal or other material, and usually circular in form, or whether the same be a ticket printed on paper or other card-board. The apparatus hereinafter described is, however, in some of its features particularly adapted for use with checks of metal or some such heavy material appropriately stamped, cast, or otherwise made.

The check-delivery apparatus consists of an apparatus from which, by the operation of suitable mechanism, the checks may be obtained from time to time as required, and with which is combined a register for showing the number of checks removed or ejected. The parts of this apparatus are preferably kept concealed or inclosed in such way that the apparatus cannot be tampered with, and that checks cannot be obtained without an attendant operation of the devices whereby the register, either at the office or place where the apparatus is located or at the central or supervising office, is operated.

The check-receiving apparatus is an apparatus or receptacle in which the checks are deposited after they have served their temporary purpose, and with which is also preferably combined a register that is operated by the checks.

The central or supervising station is one where a supervision may be had by any proper authority of the operations of the check-delivery apparatus at the one or more points where the latter are located. The apparatus at the supervising-station consists of a register operated or controlled by electricity and electrically connected with any proper part of the check-delivery apparatus in such way that the latter cannot be operated for the purpose of furnishing or delivering checks without producing a corresponding operation of the register at the central or supervising station.

These several apparatus mutually give a complete control and supervision of the operations of the employés engaged in using the checks and receiving money, inasmuch as any variation in the condition or the indications of any two would of itself be the immediate occasion for an investigation of the discrepancy.

Having set forth the general plan of my invention, I will proceed to describe special devices and combinations of devices involving my invention, having reference to the accompanying drawings, in which—

Figure 2:
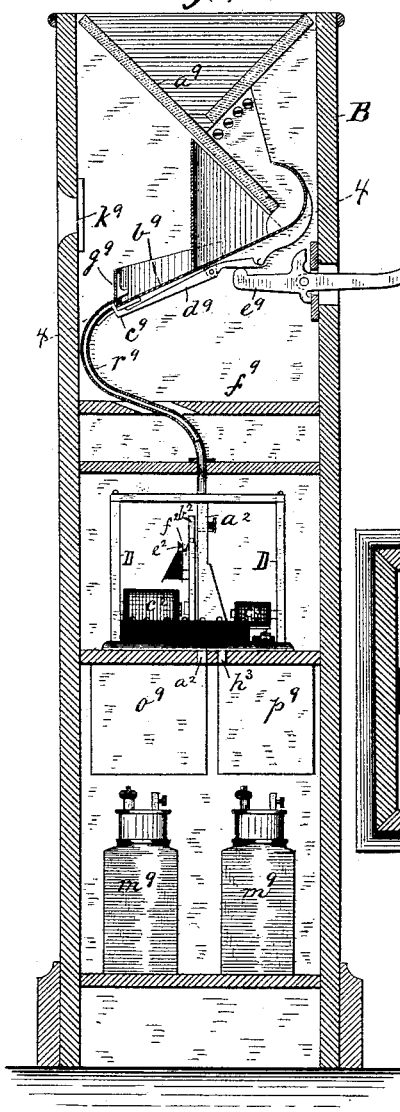
Figure 4:
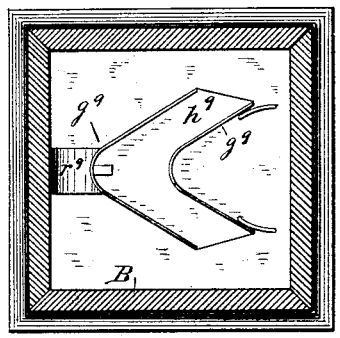
Figure 3:
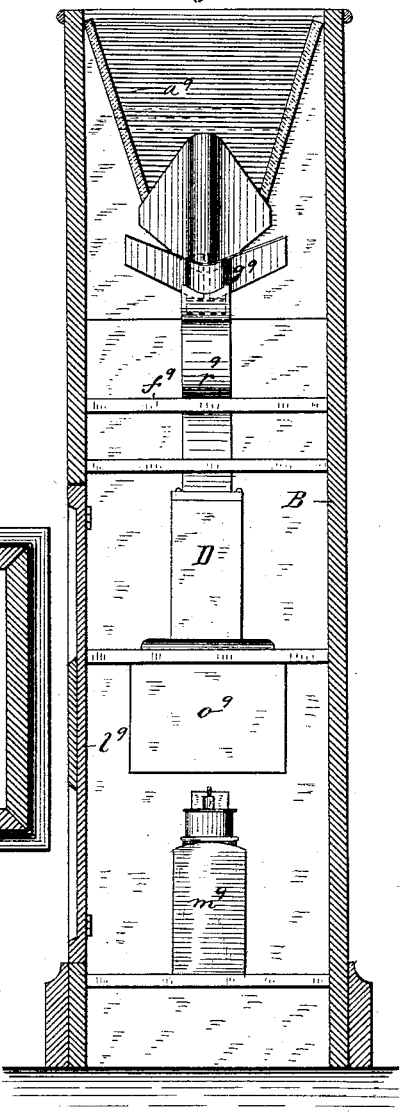
Figures 5, 6:
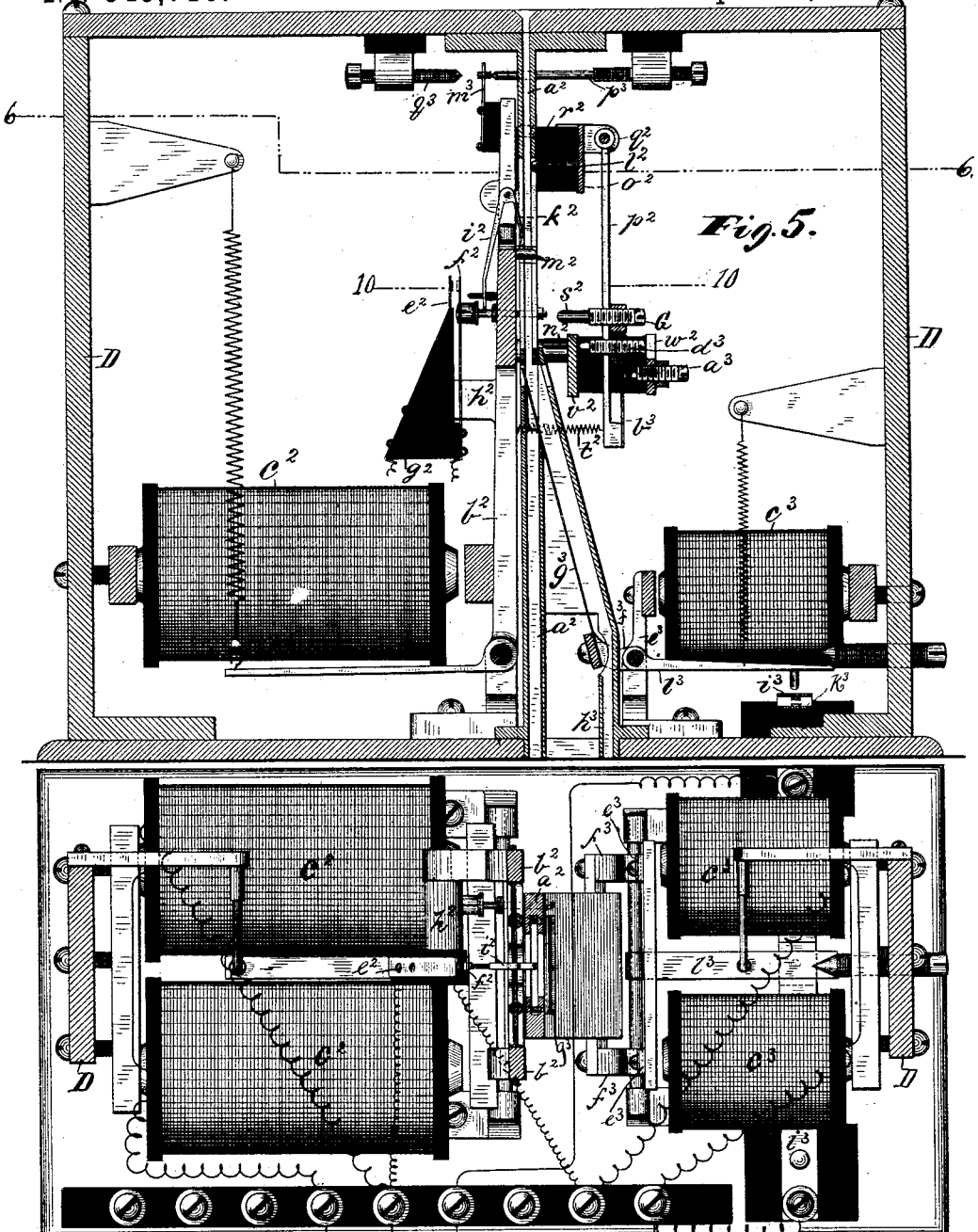
Figure 20:
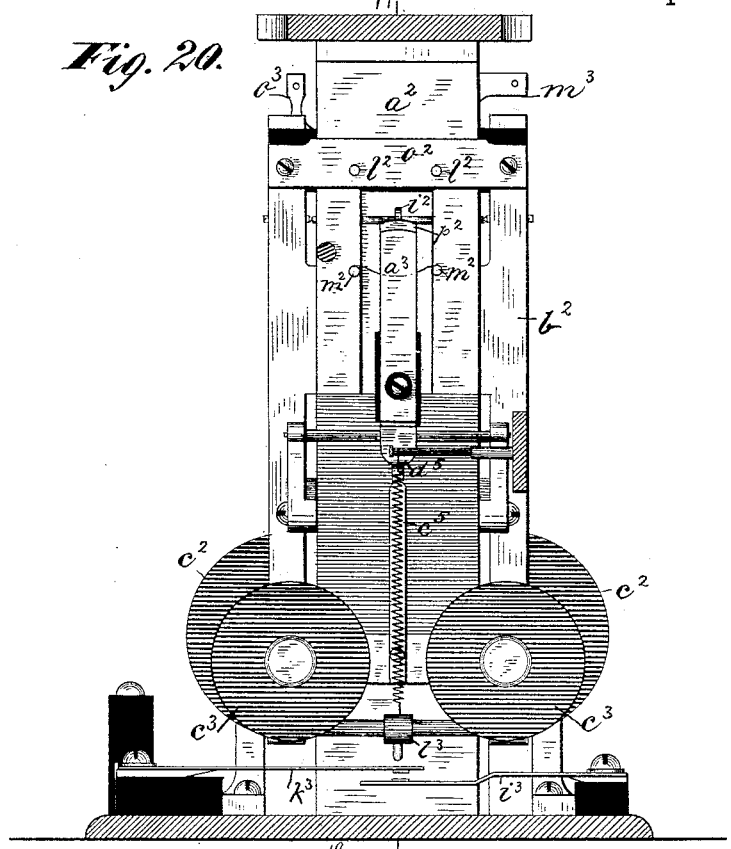
Figure 21:
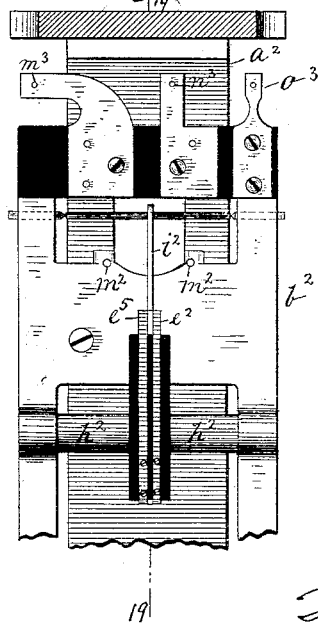
Figure 22:
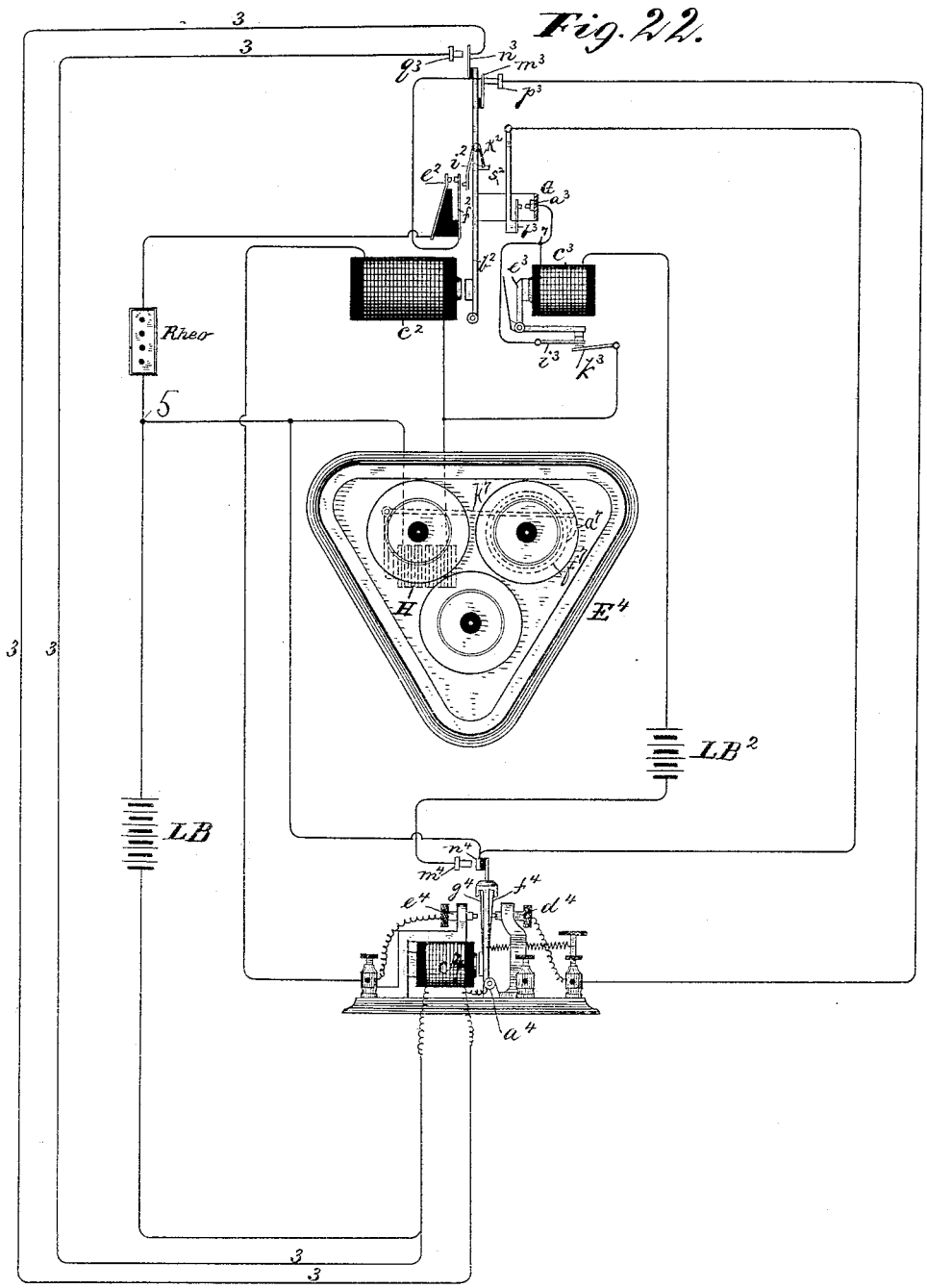
Figure 23:
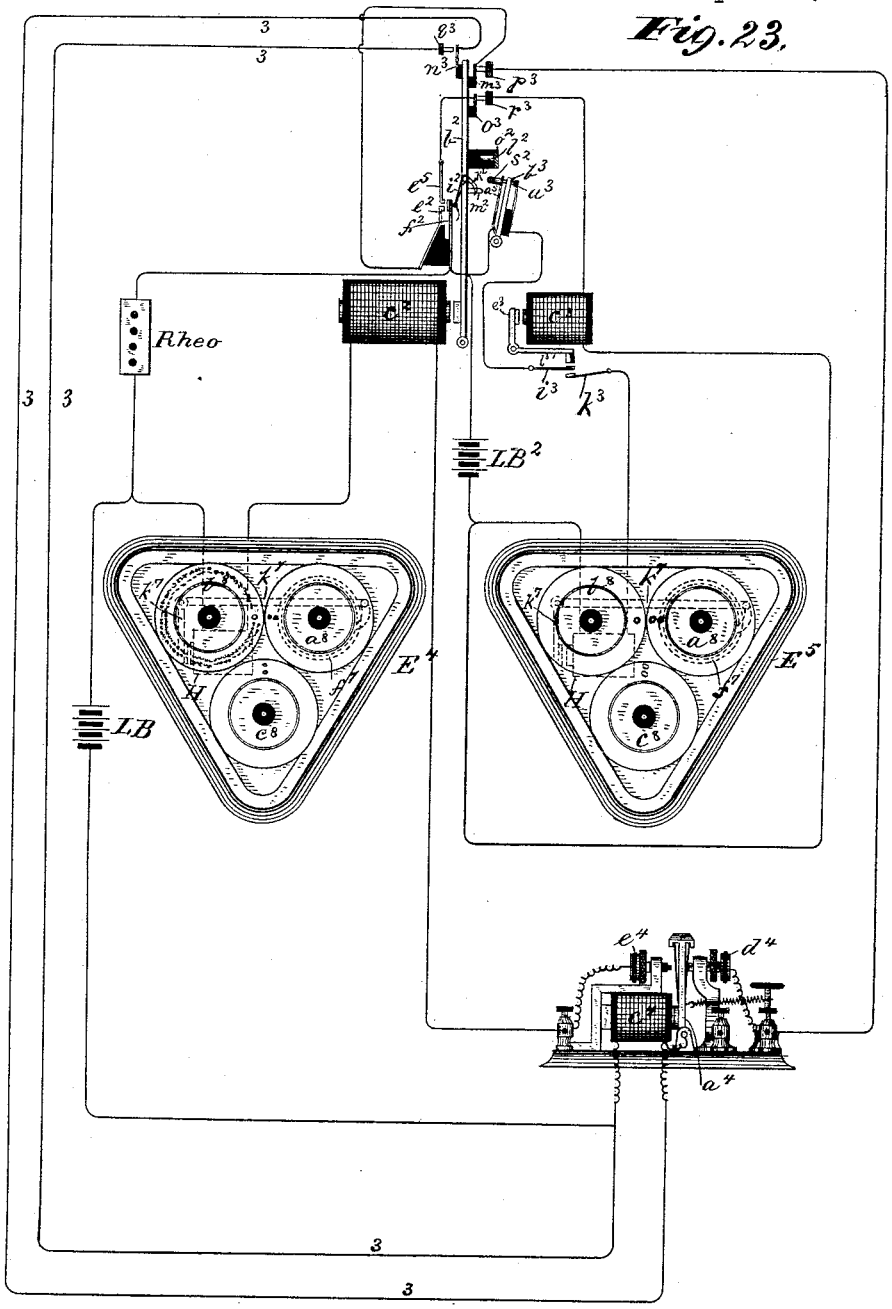
Figure 30:
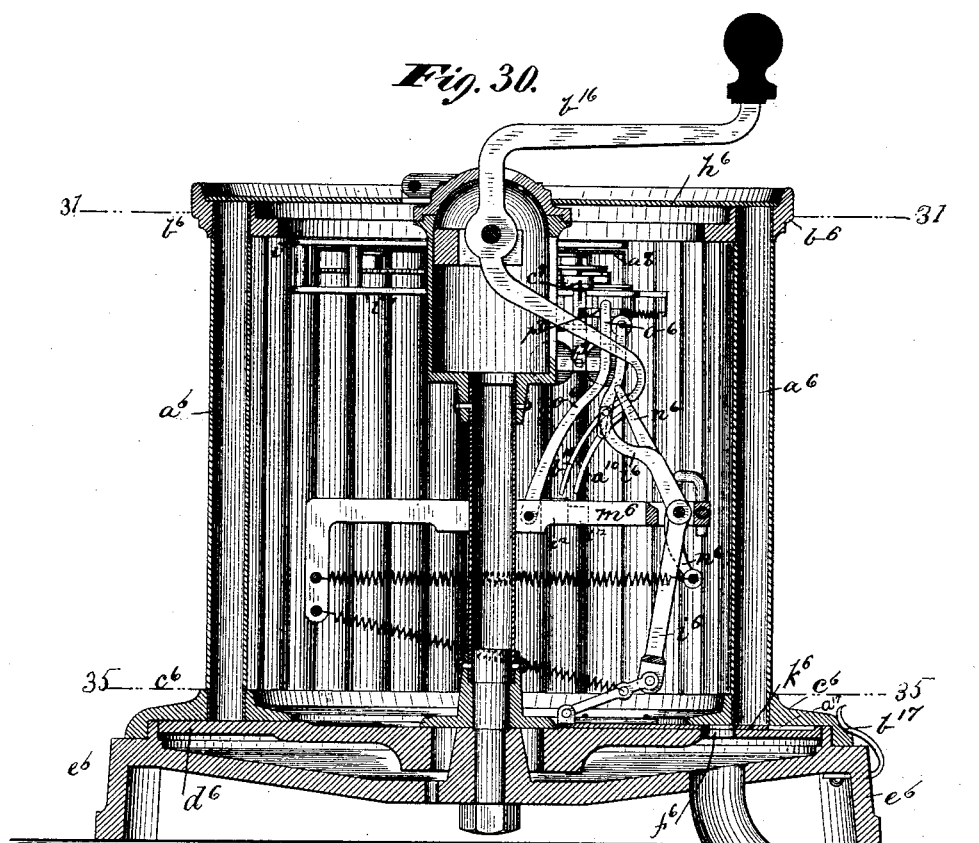
Figure 31:
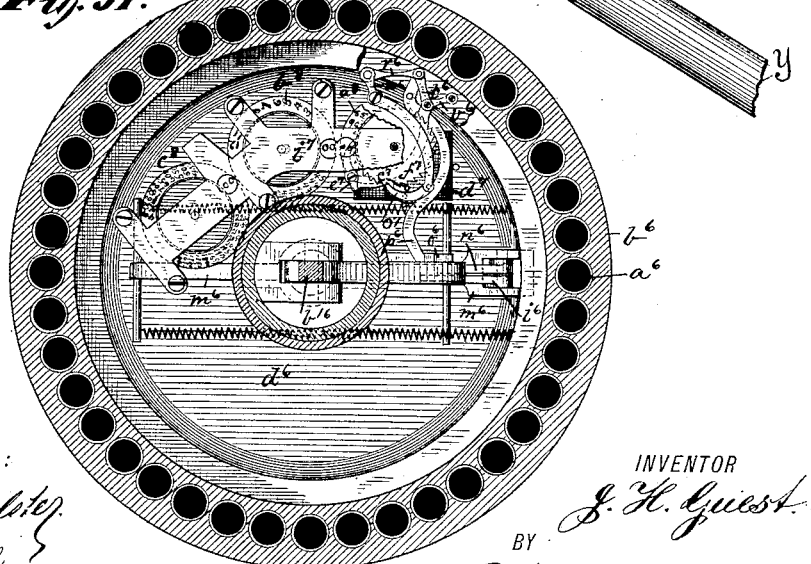

Figure 1 is a diagram of circuits and apparatus. Fig. 2 is a vertical section of the check or ticket receiving box. Fig. 3 is a vertical section of the same on a line at right angles to that on which Fig. 2 is taken. Fig. 4 is a cross-section of the box on the line 4 4, Fig. 2. Fig. 5 is a vertical section of the registering apparatus in the check-receiving box. Fig. 6 is a horizontal section on the line 6 6 of Fig. 5. Fig. 7 is an elevation of a portion of the registering apparatus as it appears looking from the right in Fig. 5. Fig. 8 represents a series of checks as they approach the circuit-controlling devices connected with the check-tube or guideway. Fig. 9 is an elevation of a portion of the registering apparatus as it appears looking from the left in Fig. 5. Fig. 10 is a cross-section on the line 10 10 of Fig. 5. Figs. 11 and 12 represent a modification of the circuit-controller operated by the checks or other objects in their passage through the tube or guideway. Fig. 13 illustrates a modification and form of the check. Figs. 14 and 15 represent the parts of the circuit-controller operated by the checks for producing an action of the register in their two positions, certain of the devices being represented in modified form in order to better illustrate the principle of action. Fig. 16 is an elevation of the parts of a clock or time-piece constructed to operate on an electric switch for changing the circuits in the delivery apparatus. Fig. 17 is a vertical section of the switching devices on the line 17 17 of Fig. 16. Fig. 18 is a side elevation of a modified construction of apparatus for securing the operation of a circuit-controller by the checks in their passage through the tube or guideway, and for producing a classified registry of different classes or kinds of checks. Fig. 19 is a vertical section on the line 19 19 of Fig. 18. Fig. 20 is an end elevation of parts shown in Fig. 18. Fig. 21 is an end elevation looking from the opposite side. Fig. 22 is a diagram of the circuits for the apparatus shown in Fig. 5. Fig. 23 is a diagram of the circuits for the purpose shown in Fig. 18. Fig. 24 is a plan view of the register. Fig. 25 is a longitudinal section through one of the wheels and indicating-disks of the register. Fig. 26 is a side elevation of the operating-magnet of the register. Fig. 27 is a plan of the three indicating-disks of the register. Fig. 28 is a plan of the register with the cover removed. Fig. 29 is a cross-section through the registering devices inverted. Fig. 30 is a vertical section of the portion of the check-delivery apparatus containing the checks and the ejecting mechanism, with the register mechanically operated by the ejecting mechanism. Fig. 31 is a cross-section on the line 31 31 of Fig. 30. Fig. 32 is a plan of the portion of the register shown in Figs. 30 and 31. Fig. 33 is an end elevation of a portion of said register. Fig. 34 is a side elevation of the same portion. Fig. 35 is a plan and cross-section of a portion of the apparatus shown in Fig. 30 on the line 35 35. Fig. 36 is a cross-section on the line 36 36 of Fig. 35. Fig. 37 is a plan of a portion of the bed-plate on which the check-holding tubes move. Fig. 38 is a section on the line 38 38 of Fig. 37. Fig. 39 is a side elevation of the operating-lever and connected parts in the apparatus of Fig. 30. Fig. 40 is a side elevation of the lever carrying the circuit-closing springs. Fig. 41 is an end elevation of the parts shown in Fig. 39. Fig. 42 is a side elevation of the relay. Fig. 43 is a plan of the relay.

In the diagram, Fig. 1, A indicates the check-delivery apparatus placed, for instance, at a station of an elevated road and under the control of the ticket-agent who receives the fares.

B indicates the check-receiving box, into which the checks delivered by the ticket-agent in exchange for fare are deposited by the passengers as they pass to the station-platform and the cars.

The supervising-station (indicated at C) may be a room in the company's offices or located in any other desired place, and is connected with the check-delivery apparatus A by means of an electric circuit, 2 2, which at the central office C passes through a register, $E^3$, adapted to be operated or controlled by electric currents. The circuit 2 2 at the station A passes through the check-delivery apparatus in such way, as will be presently described, that checks, tickets, or other tokens cannot be delivered without operating a circuit-controlling device connected to the circuit 2 2 through its branches 11 and 22.

A local register, by which a registry may be kept of the operation of the check-delivery apparatus at the place where such apparatus is located, is indicated at E. This register may be operated electrically or mechanically, as desired, though I have hereinafter described it as operated principally by mechanical means. A second register, $E^2$, may also be located at the station A, (see Fig. 1,) if deemed desirable, and such register has its electro-magnet H included in the electric circuit 2 2, so that the same electric currents or pulsations that operate the register $E^3$ will also operate the register $E^2$.

The electric generator placed on circuit 2 2 for producing the desired electrical operations is indicated at M $B^2$. The controlling or operating magnet H of the register $E^2$ is also preferably constructed or connected with the mechanism of the check-delivery apparatus in such way that it cannot be tampered with to permit checks to be delivered without operating such register.

Where two sets or kinds of checks are employed—as, for instance, for five and ten cent fares, respectively—it is desirable to change the action of the register at A, and also at C, so that they shall show the proper totals. This is accomplished by the employment of an electric switch and two sets of circuit-controlling devices connected with the check-delivery apparatus, one of said sets being thrown into and the other out of circuit at the time at which it is necessary to change from the use of one set of checks to the use of checks of the other kind. These two sets of circuit-controllers are properly constructed to send electric pulsations or currents over the circuit proper for producing an action on the register corresponding to the kind of check that is for the time being employed. The switching is preferably done automatically by the employment of a clock mechanism, F, that shall operate the switch and change the connections of the circuit-controllers at the beginning and termination of commission hours or the period during which a lower rate of fare is charged.

The checks delivered by the employé having charge of the apparatus A are taken by passengers, and are deposited in the check-receiving box B in just the same way that the tickets now employed are deposited.

Before describing the construction of the registers and of the check-delivery apparatus employed at stations A and C, I will describe the construction of check-receiving apparatus employed in the box B. With this check-receiving apparatus is also used an electric register, (one or more,) indicated at $E^4$, by which a registry of the number of checks, and, if desired, a classified registry, may be kept. This register, which is similar to those employed at the other points, A C, is illustrated in detail views in Figs. 24, 25, 26, 27, 28, 29, and will be more particularly described hereinafter.

The construction of the box B and of the check-receiver proper is illustrated in a general way in Figs. 2, 3, and 4. The details of construction of the check-receiver are more fully shown in Figs. 5, 6, 7, 9, 10, 14, 15.

Referring first to Figs. 2, 3, and 4, $a^9$ indicates the usual hopper, into which the checks are dropped and from which they pass to a pan or platform, $b^9$, where they are temporarily detained by the stop $c^9$, projecting through the bottom of the platform, as indicated, and mounted upon a lever, $d^9$, that is in turn operated by a lever, $e^9$, whose handle projects through the casing of the box. On the platform $b^9$ the checks may be inspected, and any foreign articles may, if desired, be withdrawn by the insertion of an implement through an opening, $k^9$. The walls or sides $g^9$ of the platform are curved, as indicated, upward, and between them is formed a way, $h^9$, through which foreign objects may be pushed or drawn until they drop over the edge of the platform and fall to the bottom $f^9$ of the upper portion of the case B. When the stop $c^9$ is withdrawn, the checks pass in succession through a guide, tube, or chute, $r^9$, as indicated, to the check-receiver proper.

The tube, chute, or guideway of the check-receiver proper is indicated at $a^2$. The lower end of said tube terminates in a receptacle, $o^9$, in which the checks are finally received. I sometimes employ another receptacle, $p^9$, when it is desirable to classify, separate, or distribute the different kinds of checks, which may be done by mechanism to be hereinafter described. The tube or guideway opening into the latter, and into which the checks are directed by suitable mechanism, is indicated at $h^3$. (See Fig. 2.) In the lower part of the box B are indicated the cells $m^9$ $m^9$ of the battery or batteries employed in operating the electro-magnets of the check-receiving apparatus, and of the electric register, when one is employed in connection with said apparatus. The parts inclosed in the box B are preferably kept under lock and key, and access to them is only permitted to a person in authority. A door, through which access may be had to said apparatus and to the checks after they are finally deposited in the receptacles $a^9$ $p^9$, is indicated at $l^9$.

The details of construction of the check-receiving box and of the mechanism whereby a registry of the number of checks may be kept, and whereby, also, if desired, the checks of different characters may be classified or distributed, are indicated in Figs. 5 to 15, inclusive.

D indicates the frame of such apparatus, and $a^2$ the chute or guideway through which the checks or tokens pass. In passing through said tube the checks individually and in succession operate a suitable circuit-controller of any desired kind that will serve to operate upon an electric circuit, so as to close, interrupt, or change the same in any proper manner to produce an operation of an electro-magnet or other device responsive to electric currents. A simple form of such circuit-controller, and one especially adapted to this apparatus, is made by mounting two circuit-closing springs, $e^2$ $f^2$, in proper proximity to an arm or lever, $i^2$. The springs $e^2$ $f^2$ are normally insulated from one another by being secured to a block, $g^2$, of insulating material mounted in a bracket or arm, $h^2$, carried by an armature-lever, $b^2$. The springs may be pressed into contact by the arm $i^2$, for the purpose of closing the electric circuit. An arm, $k^2$, connected with arm $i^2$, projects into the guideway or chute $a^2$, so that the checks in their passage through the chute will throw the arm $k^2$ to one side, and will operate the arm $i^2$ so as to close the circuit.

I do not limit myself to the particular construction of circuit-controller just described, and other forms may be employed and will readily suggest themselves to those skilled in the art, in various shapes. A simple circuit-closing device that may be employed is illustrated in Figs. 11 and 12, and is adapted for use when metallic checks are made use of. The device consists simply of two contact-springs, $a^{13}$, mounted on a suitable insulating-block, and having their free ends arranged so as to project slightly into the path of the checks, so that the latter in moving by them will make contact with both springs and close an electric circuit between them. The circuit-controller devices are preferably mounted upon a lever, $b^2$, which carries the armature for an electro-magnet, $c^2$. The primary function of this magnet is, by moving the lever $b^2$, to operate certain stop devices, whereby the checks may be temporarily detained before passing into engagement with the circuit-controller, so that there shall be a space or interval between them as they operate upon the same. By this means a full and certain movement of the circuit-controller may be obtained. The parts of the circuit-controller might be otherwise mounted and otherwise operated without departing from the invention, the only object being that each successive check, token, or other object shall, in passing through the guideway or chute, close or otherwise operate upon an electric circuit or circuit-controller. The detaining devices are here shown as consisting of certain spacing stops or fingers $l^2$, whose action will be more fully described presently. Other stops, indicated at $m^2 n^2$, are also operated by lever $b^2$. The last set, $n^2$, is not necessary to the operation of the apparatus when it is desired simply to register one class of checks. The fingers or stops $l^2$ are mounted on a cross-bar, $o^2$, secured to blocks of insulating material $r^2$, that in turn project from and are carried by the lever $b^2$. These stops or fingers are properly arranged so that when the lever is drawn up by the electro-magnet the stops or fingers will come into engagement with a coin, check, or other object, and will temporarily hold it. The second set of stop fingers or stops, $m^2$, are placed in position just below the parts of the circuit-controller, so that the checks will be temporarily detained at the point where they act on said controller. The stops $l^2$ are those whereby a space or interval is caused to exist between the checks in their passage to the circuit-controller. The two sets $l^2 m^2$ of stops are at such distance apart that when two or more checks are following one another and in contact, and when the lower one of the two is held by the stops $m^2$, the stops $l^2$ will come beneath the second or upper of the two checks, if at such time the lever $b^2$ is thrown over by the electro-magnet. The stops $m^2$ project directly from the lever $b^2$, and when said lever is retracted or in normal position are in the path of any checks that would pass through the chute. In such position of the parts the stops $l^2$ are withdrawn from the passage, as indicated in Figs. 5 and 14.

Three sets, $l^2 m^2 n^2$, of circuit-controlling stops or contacts, are carried by the lever $b^2$. Some of them may be omitted, as will be hereinafter shown. These devices consist of springs $m^3 n^3 o^3$, (see Fig. 9,) secured to a block of insulating material at the upper end of the lever, and three contact stops or screws, $p^3 q^3 r^3$, (see Figs. 5 and 7,) suitably mounted on the frame D. The springs $m^3 o^3$ normally, or when the lever $b^2$ is retracted, rest against their contact-stops $p^3 r^3$. The spring $n^3$ (see Fig. 9) is normally out of contact with its stop $q^3$; but when the lever is drawn up by the electro-magnet $c^2$ circuit is closed at $m^3 q^3$ with the final effect, as will be hereinafter shown, of throwing the electro-magnet $c^2$ out of action and allowing the lever $b^2$ to drop back to its normal position.

It may sometimes be desirable to use different kinds or forms of checks which shall all pass through the same guideway or chute $a^2$. In such case I employ what I term a "selecting-finger" or "feeler," which may be moved automatically into position to engage with the different checks or objects, and which shall act in different ways, according to the difference in the character or form of the check or token which for the time being is in position opposite the selecting-finger. This selecting-finger is preferably used as a circuit-controlling device, and by it a suitable classification or enumeration of the different classes of checks or other objects passing through the chute or guideway may be obtained. Such classification or enumeration may be obtained in various ways—as, for instance, by operating upon electric registering devices, or by controlling the operation of a flap, valve, or guiding device that shall, according to its position, divert checks or tokens of certain character into the passage $h^3$, or allow them to pass directly through the chute or passage $a^2$ to receptacle $o^9$. When checks or tokens of different kind or value are employed, they may be distinguished, for instance, after the manner shown in Fig. 8, where I have shown the two upper and lower checks as provided with a central perforation, while the two middle checks are unperforated. With the arrangement of apparatus and devices herein described the perforated checks may correspond to a five-cent rate of fare, and checks of this kind are only to be delivered from the check-delivery apparatus during the so-called "commission hours." As will be made obvious, the checks might be cut away at other points, instead of at the central portion, and checks of additional denominations might be employed and distinguished from one another by the location of the cut-away portions. In such case a number of feelers or selecting-fingers, $s^2 s^2 s^2$, (see Fig. 13,) one less in number than the number of different denominations employed, could be employed and arranged in proper position to engage with the successive checks or other objects as they pass through the chute. Such an arrangement is indicated in Fig. 13, where four classes of checks, $m^{13} m^{14} n^{13} n^{14}$, are employed, and the checks of the various denominations are distinguished by the location of the imperforate portion in the horizontal line. The selecting fingers or feelers would also be arranged in horizontal line, and each would under such arrangement be permitted to move transversely to the checks only when a check of denomination corresponding to such selecting finger or feeler came into position opposite the set of feelers. A form of selecting-feeler that may be employed is indicated at G, Figs. 5, 18, and 19, and is so connected with lever $b^2$ that when magnet $c^3$ is energized the pin or finger $s^2$ of the feeler will be drawn transversely to the line of movement of the checks, and, if it meets with an obstruction in the shape of a portion of the check, will have its movement stopped, so that another part that continues to move with the lever $b^2$ may make or break contact with a part carried by or moving with the finger, and thus close or break an electric circuit. Should the finger of the feeler on being drawn to one side by the lever $b^2$ pass into a cut-away portion of the check, no effect will be produced. The finger $s^2$ is carried by a lever, $p^2$, that in turn is mounted or swung from brackets $q^2$, secured to posts projecting either from the lever $b^2$ or from an independent support. At the lower end of lever $p^2$, or at any other portion of the same, is suitably mounted a circuit-closing spring, $b^3$, forming one electrode of a circuit-controller whose other electrode consists of a contact screw or point, $a^3$, which is mounted in a cross-bar, $w^2$, supported on insulating posts or pins projecting from cross-arm $v^2$, which latter in turn is carried by posts or pins projecting from the lever $b^2$, as seen in Fig. 10. As will be obvious, the contact $a^3$ moves with the lever $b^2$ under all conditions. Movement is communicated to the lever $p^2$ and the selecting-finger by means of springs $t^2$, attached to armature-lever $b^2$, or other flexible or extensible connection, the purpose of which is to permit the pin or projection $s^2$ to come to rest without obstructing or stopping the motion of the lever $p^2$ and the contact $a^3$, carried thereby. I have described the contact $a^3$ as mounted upon or carried by the lever $p^2$; but, as will be presently shown, said contact might be mounted upon a lever worked by another magnet. An adjustable stop, $d^3$, carried by the lever $p^2$ and abutting against the cross-bar $v^2$, may be employed to adjust the position of the finger $s^2$. The circuit-controlling feeler G, made up of the parts described and designated by the letter G, is employed for operating upon the device already referred to for obtaining a classified registry or distribution of the checks or other objects.

In the arrangements of devices shown in Figs. 5, 6, 7, 9, and 10, the circuit-controlling finger or feeler is employed for operating a valve or flap, by means of which checks or other objects of certain character may be diverted or turned aside from the guideway or chute $a^2$ into another guideway or chute, $h^3$, or may be permitted to pass directly through the passage $a^2$. Under the arrangement herein shown the checks undiverted would be those whose centers are imperforate—that is to say, checks $n^{12}$—since the parts are so arranged that the checks will be temporarily brought to rest with their centers in position opposite the pin $s^2$, when the same is drawn to one side, and the obstruction to the movement of said finger produced by the check $n^{12}$ will result in a closure of the circuit and the operation of an electro-magnet, $c^3$, whose armature-lever $e^3$ operates a flap-valve, $g^3$, (see Fig. 5,) the upper end of which latter normally projects into guideway or chute $a^2$, so as to divert the checks into the channel $h^3$, excepting when it is drawn over by the electro-magnet $c^3$ out of the way of the checks.

The device whereby the checks are temporarily brought to rest in position opposite the pin or finger $s^2$ of feeler G consists of the two stop-pins $n^2$, mounted on the cross-arm $v^2$, supported from the lever $b^2$, as more clearly shown in Fig. 10. The valve $g^3$ is supported on arms $f^3$, as shown in Figs. 5 and 6, that project from the rock-shaft supporting the armature-lever $e^3$. The electro-magnet $c^3$ also acts upon a circuit-controller consisting of two springs, $i^3 k^3$, arranged with their contact or free ends one above the other and in position to be thrown into contact by the impingement upon them of an arm, $l^3$, projecting from the rock-shaft of armature-lever $e^3$. This circuit-controller is employed for the purpose of working an electric register, which is brought into action to register the class of checks that are properly formed to allow the circuit-controlling feeler or finger G to act in such way as to operate the magnet.

Under the arrangement of the devices shown the class or character of checks that will be diverted into the channel $h^3$ by the valve $g^3$ are those which do not produce any change in condition or relative position of circuit-controlling parts of the finger or feeler, and, as will be obvious, the checks passing through the channel $h^3$ are therefore those whose center is perforated. This is because of the fact that the valve $g^3$ is normally in position to divert any checks passing into the upper end of the guideway or tube $a^2$, and that the pin $s^2$ meets with no obstruction, so that the two parts of the circuit-controller $b^3 d^3$ move to the same extent. The magnet $c^3$ is hence unaffected, and the valve remains in the position shown. If the circuit-controlling finger or feeler meets with a check having an imperforate portion opposite the pin, the electro-magnet $c^3$ is operated, the valve $g^3$ is shifted, and the check, on being allowed to continue its movement past stop $n^2$, will continue directly through the guide or passage $a^2$ into the receptacle $o^3$.

As will be apparent from Fig. 5, the stops $l^2 m^2 n^2$ are so arranged that when the lever $b^2$ is retracted from its magnet the stops $m^2$ are in position to bring any check temporarily to rest, while when the lever $b^2$ is drawn forward by its electro-magnet the stops $l^2$ $n^2$ are brought into the path of the checks so as to temporarily detain them. When the lever is moved so as to withdraw the pins or stops $n^2$ and allow a check to escape by them, the pins $m^2$ are at the same instant brought into the path of the check and hold it, and at the same instant the finger or feeler G performs its office.

In conjunction with the parts already described I ordinarily prefer to employ an electric relay, Z, which is shown more in detail in Figs. 42 and 43, but is illustrated in its essential parts in the diagram, Fig. 22. The relay-armature is provided with three sets of circuit-closing points, and is thus constructed: At one end the lever is formed into a double hook, $b^4$, with which two springs, $g^4$ $f^4$, carried on opposite sides of the lever, tend normally to make contact. The contact-stops against which said springs bear, respectively, in the two opposite positions of the lever, are indicated at $e^4$ $d^4$. When the lever is retracted, the spring $f^4$ is in contact with stop $d^4$, and is by the latter held out of electrical connection with the hook $b^4$ and the lever $a^4$. When the lever is drawn forward, the spring $f^4$ leaves stop $d^4$, and by its own resiliency makes contact with the hook $b^4$ at the same time the spring $g^4$, which in the first considered position was in electric connection with the hook, comes into contact with stop $e^4$ (making electrical connection therewith) and is pressed out of connection with the hook.

In addition to the parts described is a contact-spring, $n^4$, (see Fig. 43,) mounted on an insulating-block secured to the lever $a^4$, and arranged with its free end between two stops, the front end of which, $m^4$, is a circuit-closing stop, while the opposite end is an insulated stop. The two latter stops are mounted on a block or piece, $c^{12}$, (see Fig. 42,) whose base, $b^{12}$, is secured to a block of insulating material resting on the frame carrying the stop $e^4$. The electro-magnet of the relay is indicated at $c^4$. When the magnet is inactive, and the lever $a^4$ is retracted, circuit is broken at contacts $m^4$ $n^4$.

The diagram, Fig. 22, shows the manner in which the parts of the check-register described may be connected and operated. The electric register, to be acted upon through the agency of the circuit-controller operated by the checks or other objects passing through the guideway or tube $a^2$, is indicated at $E^4$. (See Fig. 22.) H indicates the electro-magnet of said register, which magnet, as will be hereinafter described, and as shown in Figs. 26, 28, and 29, has an armature-lever, $k^7$, that operates upon a pawl, $a^7$, which at each complete movement of the armature backward and forward throws the units-wheel $f^7$ of the register forward one step, or gives any other unitary registration. The particular arrangement of circuits and devices shown in this diagram is designed, among other things, to give a proper total registry upon the same register $E^4$ for checks of different denominations or values passing through the guideway or chute $a^2$, and, as will be presently seen, the arrangement is such that while a five-cent check will produce one movement of the units-wheel, a ten-cent check will, through the agency of the circuit-controlling finger or feeler G, produce an extra movement of the units-wheel, so that the registration will be, as required, two times as great.

L B indicate the local battery or generator that operates the electro-magnet H when the circuit-controller $i^2$ (see Fig. 22) is operated. L B$^2$ indicates another generator, which operates the electro-magnet $c^3$, and also acts upon electro-magnet H when the circuit-controlling finger or feeler meets with a ten-cent check.

An artificial resistance is indicated at Rheo. The circuits are as follows: In the case of battery L B one circuit is from positive pole of L B through the rheostat, points of circuit-controller $e^2$ $f^2$, (when the same is operated by a check on its passage through the tube or guideway,) contacts $m^3$ $p^3$, when the lever $b^2$ is against its back stop, back contacts, $d^4$ $f^4$, of the relay-lever, lever $a^4$, electro-magnet $c^4$, and back to the battery. When the circuit is closed at the front stops, $q^3$ $n^3$, a shunt around the electro-magnet $c^4$ is completed in an obvious manner. Another circuit for the battery L B is from point 5 (see Fig. 22) to electro-magnet H, electro-magnet $c^2$, front contact, $e^4$ $g^4$, of the relay, (when the armature-lever is drawn up,) armature-lever $a^4$, electro-magnet $c^4$, and back to the battery. The current on this circuit may be shunted from the electro-magnet $c^4$ by means of the contacts $q^3$ $n^3$, governed by lever $b^2$ of electro-magnet $c^2$, through the shunt-wires 3 3, which shunt is completed when the magnet $c^2$ has drawn lever $b^2$ fully up. The local battery L B$^2$, starting from its positive pole, has two paths or circuits, one of which is through electro-magnet $c^3$, contacts $a^3$ $b^3$ of the circuit-controlling finger or feeler, contacts $m^4$ $n^4$ of the relay, (when the armature-lever thereof is drawn forward,) and back to the battery. Another circuit for said battery is through electro-magnet $c^3$ to point 7, (see Fig. 22,) thence through springs $i^3$ $k^3$, constituting the circuit-closing portions of the circuit-controller operated by electro-magnet $c^3$, thence to electro-magnet H, and back to the opposite pole of the battery through the contacts $m^4$ $n^4$ when the lever $a^4$ of the relay is drawn up. Let it be supposed that the parts of the apparatus are in the position shown in the diagram. Under this condition the circuit for the battery L B, through relay-magnet $c^4$, is broken at the points $e^2$ $f^2$ of the circuit-controller $i^2$, but is closed at contacts $p^3$ $m^3$ and at the back contacts of the relay. (The contacts $m^3$ $p^3$ might be omitted when the relay is employed, and the circuit continued without interruption around them, as indicated by the dotted line.) There is no circuit through the electro-magnet H and $c^2$, because that circuit is broken at the front contacts of the relay. The circuits for battery L B$^2$ are broken at circuit-controlling finger or feeler G and at the contacts $m^4$ $n^4$ of the relay. The circuit for said battery through the electro-magnet H is broken at the latter points, and also at the points of the circuit-controller operated by electro-magnet $c^3$. The stop-fingers $l^2$ and $n^2$ will not obstruct the passage of the checks through the tube $a^2$; but the stop-fingers $m^2$ are in position to hold or stop the checks at the point opposite the circuit-controller $i^2$. Let it be supposed that the three upper checks of Fig. 8, following one another in contact, pass through the guide-tube $r^3$ and into the upper end of the guide $a^2$. When the lower check reaches stops $m^2$, the three checks are prevented from moving for an instant until, by the operation of the circuit-controller $i^2$ through the action of the lower check, the circuit for the battery L B has been completed through the relay $c^1$, and said relay has closed the circuit on its front contacts, $e^1 g^1$, so as to bring the electro-magnet $c^2$ into action, and thus move the lever $b^2$ to the left or to its magnet. At the same time the electro-magnet H of the register $E^1$ is energized, and, being immediately thereafter de-energized through the shunting of the relay and the opening of the circuit at the front contacts of the relay, produces a movement of the units-wheel of the register forward one step. When said lever $b^2$ is thus moved so as to withdraw the pins $m^2$ from beneath the lower check, the latter is allowed to move on; but the two checks above are held through the simultaneous movement of the detaining-stops $l^2$, which latter come beneath the second of the three checks and hold the same until the lever $b^2$ moves back to its original position. The same movement of the lever $b^2$ which disengages the lower check by removing the stops $m^2$ moves the lower stop or stops $l^2$ and the finger $s^2$ simultaneously, so that the lower check is immediately detained, and at the same time the selecting device is permitted to do its work. The lower check being imperforate at its center, the circuit of the local battery L B$^2$ will be closed at points $b^3 a^3$, and the other break in the circuit having been closed at $n^4 m^4$ by the operation of the relay, which, as just mentioned, has been energized, so as to bring into action the magnet $c^2$, it is obvious that the electro-magnet $c^3$ will be energized. Through the operation of this magnet the flap or valve $g^3$ is moved, so as to open the passage $a^2$ to the receptacle $a^3$ and close the opening to the tube $h^3$, and at the same time the circuit has been closed at the contact $i^3 k^3$, so that the electro-magnet H is energized a second time, giving another movement to the units-wheel of the register, as would be required, inasmuch as the check is a ten-cent check.

In order that there may be abundant opportunity for a second action of the magnet H by the operation of the circuit-controller governed by magnet $c^2$, it is necessary that the circuit through the magnet thus controlled should be preserved at $m^4 n^4$ for a movement after the interruption of circuit at the front contacts, $g^1 e^1$, of the relay. This may be effected by proper relative adjustment of the relay-contacts. By the sluggishness of the magnet $c^3$ and the separation of the contacts of springs $i^3 k^3$ the second closure of circuit for magnet H will occur at the instant after the interruption of the first closure produced by opening of contacts $g^1 e^1$, when the relay is shunted at $q^3 n^3$. In the forward movement of the lever $b^2$, as just explained, contact is broken at $m^3 p^3$ and at the back contact of the relay $c^1$; but the relay is not thereby de-energized, inasmuch as its circuit is still complete through its front contacts, $e^1 g^1$; nor does the magnet H lose it power in the movement of its armature from its back to its front stop, since, as will be obvious, the contacts can be so adjusted that the circuit shall not be broken with $f^1$ until contact is made between $g^1$ and $e^1$. By this arrangement vibration of the relay-lever is prevented. It will also be seen that the lever $b^2$, under the action of the electro-magnet $c^2$, will make its complete movement forward, although the lower check may pass the circuit-controller, and may allow the contacts $e^2 f^2$ to open. When the lever $b^2$ completes its movement, it closes the shunt-circuit 3 at the contacts $q^3 n^3$, and the electro-magnet $c^1$ thereby loses its power, so that its lever $a^1$ now drops back, breaking the circuit of electro-magnet $c^2$, and the lever $b^2$ drops back, thereby releasing the lower check, which passes through the lower portion of the tube $a^2$, the valve $g^3$ having been set by the operation of electro magnet $c^3$, as just described. At the same time with the escape of the lower check the circuit is broken at the points of the circuit-controlling finger or feeler, but the valve is held up by the magnet $c^3$, and although the contacts $m^4 n^4$ of the relay may open, the valve does not drop back in time to prevent the check from taking the path just mentioned. With the backward movement of the lever the second of the checks is released from the detaining-fingers $l^2$ and drops down against the stops $m^2$, which have, by the backward movement of the lever $b^2$, been reset. The upper check follows down with the second, and in the repetition of the forward movement produced by the action of the second check is detained by the detaining-fingers $l^2$, as already explained. It will be obvious that by means of the detaining-fingers just mentioned the checks can reach the circuit-controller only after an interval, and that the circuit-controller is given time to make its complete movement, after being operated by one check, before a succeeding check is allowed to act upon it. The operation may be conveniently considered by reference to Figs. 14 and 15. The second check not only operates the circuit-controller $i^2$ and actuates the register $E^1$, but also in the manner just explained produces a closure of circuit at the points of the circuit-controlling-fingers $b^3 a^3$, so as to operate electro-magnet $c^3$ and give the second action of the register required for checks whose centers are not perforated. The third or upper of the series of checks operates the circuit-controller $i^2$ in the manner already explained, and is also momentarily detained by the lower stop or stops $n^2$ in position opposite the circuit-controlling finger or feeler, which latter, however, on being drawn up finds the perforation at the center of the check, so that, as already explained, the points $b^3$ $a^3$ remain open, and no operation of the electro-magnet $c^3$ or of the parts controlled thereby is brought about. The valve or flap $g^3$, therefore, retains the position shown in Fig. 5, and the perforated check is guided into the passage $h^3$ and the compartment beneath the outlet end of the latter. By the operation of the valve or flap in the manner described the checks of different denominations are assorted. The operation of the relay $c^4$ requires a current of comparatively little strength, while a current of great strength should be used for operating the electro-magnet $c^2$ and H, which are required to do considerable work. The rheostat interposed at the point shown gives a large resistance in the relay-circuit at the start, and therefore permits little current to flow to the same. When the circuit, however, is closed at the front contacts of the relay, the current from the battery L B branches from point 5, avoiding the rheostat, and can therefore circulate with greater volume in the local circuit including electro-magnets H and $c^2$. Though the checks should follow one another in an unbroken stream at the top of the guideway $a^2$, the spacing fingers or pins will operate to produce an interval between them in their successive approach to the parts of the circuit-controller. In the case of the electro-magnet $c^3$ it will be seen that its circuit is completed through contacts $i^3$ $k^3$, which are kept closed by the action of the magnet itself. The release of the armature of said magnet, so as to break the circuit at $i^3$ $k^3$, and to allow the valve $g^3$ to drop back, is effected by the opening of the contacts $m^4$ $n^4$, when, through the completion of the shunt-circuit 3, the magnet $c^4$ loses its power and permits the lever $a^4$ to drop back. The energization of the relay-magnet $c^4$ by the closure of the circuit at $e^2$ $f^2$ results in the closing of the contacts $m^4$ $n^4$, thus putting the circuits connected with battery L B$^2$ into condition to be completed through the action of the circuit-controller G and the operation of magnet $c^3$ upon the circuit-controller $i^3$ $k^3$.

It is quite obvious that a multiplication in the number of the different denominations of checks would simply require a multiplication of the number of circuit-controlling feelers or fingers and registers connected therewith, said checks being of diverse form or having diverse arrangements of imperforate and perforated portions, as already indicated in the matter referring to Fig. 13. The selecting feeler or finger might be made to control the circuit for a separate register, instead of the same register as circuit-controller $e^2$ $f^2$. In Figs. 18 and 19 I have shown a modified construction, in which the finger $s^2$ of feeler G operates upon the check at the same time that said check acts upon the circuit-controller governed by the lever $i^2$. In this instance the lower set of stops $n^2$ are dispensed with. The circuit-controlling devices governed by the finger $s^2$ consist of contacts $b^3$ $a^3$, one carried by the finger and the other by a spring mounted on an insulated support secured to the lever $p^2$. The feeler G, with its finger $s^2$, (see Fig. 18,) is mounted upon a spring, $a^5$, secured to lever $p^2$, and the latter has a downwardly-extending arm, $d^5$, which is operated or engaged by the arms $b^5$ $c^5$, connected to the armature-lever $e^2$. The spring $a^5$ serves the same purpose as the springs $t^2$ of Fig. 10. The arm $i^2$ acts upon two circuit-controllers, one of which corresponds to that formed by the springs $e^2$ $f^2$ of Figs. 5, 14, 15, and 22, while the other consists of a second spring, $e^5$, (see Fig. 21,) operating in conjunction with the springs $f^2$. (See Fig. 19.) The spring $e^5$ is insulated from spring $e^2$, and is connected with the circuit of electro-magnet $c^3$, (see Fig. 23,) so that on the closure of circuit by the operation of the check upon the arm or lever $i^2$ said electro-magnet will be operated, and will immediately throw the circuit-controlling finger or feeler toward the check. If said check be perforated, the contacts $b^3$ $a^3$ will remain out of connection, that being in the present instance their normal relative position; but if said pin $s^2$ strikes an imperforate portion of the check the part $a^3$ will be carried into contact with the contact $b^3$, which is brought to rest, and a circuit will be completed to a register, E$^5$, as will be seen on reference to the diagram, Fig. 23. In this diagram the set of contacts $o^3$ $r^3$, which are closed when the lever $b^2$ is retracted, are shown. They might be dispensed with and a continuous wire substituted for them, however. The spring $e^5$ (see Fig. 23) connects, through the contacts $o^3$ $r^3$, with the electro-magnet $c^3$, and thence with one pole of the battery L B$^2$, whose opposite pole is connected with spring $f^2$. As will be obvious, when the check acts on arm $i^2$, bringing springs $f^2$ $e^5$ into contact, the magnet $c^3$ will be energized, and will operate upon the circuit-controller formed of springs $i^3$ $k^3$, and will thereby cause an operation of the electro-magnet H for register E$^5$. The circuit thus completed for electro-magnet H is that formed from one pole—say, plus of battery L B$^2$ to the contact $b^3$, and (when the pin $s^2$ strikes a check) to the spring $a^3$, springs $i^3$ $k^3$, electro-magnet H, and back to the battery. The operation of the electro-magnet $c^2$ and the electro-magnet H of register E$^4$ is brought about in the same manner as seen in the diagram, Fig. 22, and the relay $c^4$ is thrown out of action, so as to permit the parts to resume their normal position by the closure of the circuit through the contacts $q^3$ $n^3$. It may be here observed that the electro-magnet $c^4$ of the relay might be thrown out of operation by any other circuit-controlling arrangements known in the art and properly applied to come into action on the completion of the forward movement of the lever $b^2$. It is obvious that the circuit-controlling finger or feeler operates in substantially the same manner as in Fig. 22, to select or classify the registration of the checks by registering on register $E^5$ those checks only which do not have a perforation corresponding to said feeler or finger. All checks of whatever nature obviously act upon the register $E^4$. A comparison of the registers is all that is necessary in order to obtain any desired information as to the number of the different classes of checks that have passed through the guideway or chute $a^2$. The parts controlled by electro-magnet $C^3$ are caused to resume their normal position through the deenergization of said magnet brought about by the breaking of its circuits at the contacts $o^3$ $r^3$. The latter, as before explained, are arranged so as to close circuit when the lever $b^2$ is retracted. When, however, the lever is drawn up, the contacts $o^3$ $r^3$ are separated. It is desirable that these contacts should be spring-contacts, and that the breakage of circuit should not occur until the end of the forward movement of the lever $b^2$. I find in practice that with this arrangement time is given for the operation of the selecting finger or feeler before, through breakage of circuit at $r^3$ $o^3$, the electro-magnet $c^3$ loses its power. This would naturally be the case even if the contacts $o^3$ $r^3$ were ordinary rigid contacts, because the electro-magnet $c^3$ will act much more quickly than the lever $b^2$. The tardiness of movement of the lever is due to the fact that it is not only held back by the inertia of its parts, but, in addition, the electro-magnet $c^2$ can come into operation only after the lever $a^4$ has moved sufficiently to close the circuit of $c^2$ through the front stop, $e^4$, of the relay.

I do not limit myself to any particular form or construction of circuit controllers and switches, as the same may obviously be varied in many of their mechanical details without changing their essential function in the combinations described.

The registering mechanism which is shown in the diagrams at $E^2$ $E^3$ $E^4$ $E^5$ is illustrated more fully in Figs. 24 to 29, inclusive. The casing of the apparatus is indicated at W, (see Fig. 29,) and said casing is preferably provided with a solid cover or door, the keys of which are in the control of some person in authority. The indications of the register are shown by means of three disks, $a^8$ $b^8$ $c^8$, (see Fig. 27,) which are suitably graduated at or near their periphery, and are exposed to view through narrow slits or openings. (Shown in plan, Fig. 24.) The units-wheel, or what may be called the "units-disk" in this instance, is the disk $a^8$, and for ordinary purposes it is graduated, taking five cents as the unit of its indications. The graduations run from five cents to one dollar, and the dollar-mark is indicated by the two ciphers, which appear twice in the circumference of the disk, indicating that a complete revolution thereof would correspond to forty five-cent fares. Every half-revolution of the disk indicates one dollar in fares received, and this indication is "carried," as it is technically called, to the disk of the next higher denomination, which is graduated to indicate dollars, from one to fifty. The disk $c^8$ is graduated to indicate fifty dollars and multiples thereof, up to twenty-five hundred. Movement is communicated to the units-disk $a^8$ by means of an impelling-pawl, $a^7$, Fig. 28, which operates upon a toothed wheel, $f^7$, having forty teeth. The disk $a^8$ is fixed to the shaft $d^9$, upon which the wheel $f^7$ is secured, and more clearly indicated in Fig. 25, and the pawl $a^7$ is carried by a bent lever $k^7$, which is the armature-lever of an electro-magnet, H, suitably mounted in the frame-work of the apparatus. The lever $k^7$ is pivoted at $s^{21}$, and is normally held, so that the armature of magnet H will be away from the poles, by a retractile spring, $o^{32}$, secured at one end to the frame of the register and at the other to an arm, $p^{24}$, projecting from the lever. Any ordinary retaining-pawl, $v^7$, is applied to the wheel $f^7$ to prevent backward movement thereof, and a forward movement of the wheel of more than one tooth, when the pawl $a^7$ acts, is prevented by means of a locking-pawl, $m^7$, that is carried upon a post of the frame-work, and is normally impelled toward the wheel $f^7$ by a spring, $g^8$. This pawl is normally in engagement with the wheel, but is lifted out of engagement therewith on the backward movement of the pawl $a^7$ to take hold of a fresh tooth, the direct means of lifting being an arm, $l^7$, projecting from the lever $k^7$. The pawl $m^7$ remains out of engagement until the lever $k^7$ has made a sufficient movement in a direction to impel the wheel to cause the same to move one tooth, when the arm $l^7$ allows the pawl $m^7$ to engage with a tooth and prevent further movement. The pawl $m^7$ may be removed from engagement with the wheel by means of a flexible rod or stud, $h^8$, (see Figs. 28 and 29,) fixed at one end in the frame, and projecting at its opposite end through the top plate, as shown in Figs. 24 and 29, so that when the cover is removed the pin or stud may be moved to one side to engage with the locking-pawl $m^7$ and remove it from engagement with wheel $f^7$. The stud $h^8$ is made use of when the register is to be reset to zero. The disks $b^8$ and $c^8$ are mounted upon suitable arbors, $d^{10}$ $d^{11}$, similarly to the disk $a^8$. Toothed wheels, secured, respectively, to their arbors $d^{10}$ $d^{11}$, are indicated at $p^7$ and $t^7$, Fig. 25. Movement forward of the wheel $p^7$ at the completion of every half-revolution of the wheel $f^7$ is produced by the carrying-lever $h^7$, carrying at one end an impelling-pawl, $n^7$, that works against the teeth of the wheel $p^7$, and having its other end engaging with a double cam, $g^7$, or one having two steps, that is secured to the arbor of wheel $f^7$, so as to move with the latter. The direction of revolution of the wheel $f^7$ being that of the arrow, Fig. 28, it is apparent that starting from the position shown the right-hand end of lever $h^7$ will be gradually raised on the cam-surface, so as to move the pawl $n^7$ back to engage with a fresh tooth of wheel $p^7$. When the right-hand end of the lever slips off the end of the cam to begin a new movement from the inner or lower end of the other cam, the pawl $n^7$ moves wheel $p^7$ forward one tooth. The "carrying" movement occurs, as before stated, twice in the whole revolution of the wheel $f^7$, since a whole revolution of the latter represents two dollars. The disk $a^8$ is mounted in such position that the zero or dollar indication will appear at the end of the movement, which permits the arm of lever $h^7$ to escape from the highest portion of the cam, and to "carry" to the next wheel. A similar carrying device, working upon a wheel, $t^7$, consists of lever $r^7$, pawl $s^7$, carried thereby, and a cam, $q^7$, that moves with the wheel $p^7$. The latter cam has but one step, and the wheel $p^7$ has fifty teeth, inasmuch as the unit of the indications of the disk $c^8$ is fifty dollars. A device similar to the pawl $m^7$ is applied to wheel $p^7$ to prevent overmovement of the same under the action of the impelling-pawl $n^7$. Such device consists of a locking-pin, $e^8$, which is carried upon the arm $x^7$, extending from the arm of lever $h^7$, that carries the pawl $n^7$, Fig. 28. The locking device $e^8$ is so arranged as to come into engagement with the teeth of the wheel $p^7$ at the moment that the lever $h^7$ makes an impelling movement, through the action of its spring, sufficient to carry the pawl $n^7$ to such distance as to move the wheel $p^7$ one tooth. A similar device is mounted upon a plate, $a^{15}$, formed on an arm, $w^7$, projecting from lever $r^7$, and it is arranged to engage with the teeth of wheel $t^7$, and prevent overmovement of the latter under the action of its impelling-pawl $s^7$. In order to reset this register to zero the disengaging-pin $k^8$ should be moved to one side, so as to remove the pawl $n^7$ from engagement with the dollar-wheel $p^7$, and the units-wheel should then be turned forward by a knob, $d^8$, (see Figs. 24 and 29,) on the outer end of the spindle carrying the wheel until the lever $h^7$ has been brought to the highest point on one of the cams $g^7$—or, in other words, to a point where the disk $a^8$ will show the figure 95 through the opening in the face-plate. The lever $h^7$ is by this means brought to a position where the locking-pin $e^8$ will be out of engagement with wheel $p^7$, and the latter may then be turned forward by a button, $d^8$, secured to the outer end of its shaft, until the lever $r^7$ reaches the highest point of cam $q^7$—or, in other words, a point where the disk $b^8$ shows the figure 49 through the opening in the face-plate. The locking device carried by $r^7$ is by this means raised to a position where it will be free from engagement with wheel $t^7$, and the latter may be then turned forward in a similar way until the disk $c^8$ shows 2,450 through the face-plate. By then turning the disk $a^8$ and wheel $f^7$ forward one step the lever $h^7$ drops off the end of the cam, thus moving the wheel $p^7$ forward one tooth and permitting the lever $r^7$ to escape from the upper or highest portion of the cam $q^7$, and to move the wheel $t^7$ one tooth.

These movements of the several disks result in carrying them to the zero-point or position where they will all show zero through the openings in the face-plate. The disengaging-stud $h^8$ having been allowed to resume its normal position, the apparatus is in condition to register the number of electric pulsations flowing in the coils of electro-magnet H. Such electro-magnet being connected, as already explained, in the various circuits, the several registers will indicate the amount of five-cent checks delivered and deposited. Where the register is designed to indicate only the amount of ten-cent checks deposited or delivered, it is only necessary to change the indications on the dial $a^8$ to indicate ten and multiples of ten up to one dollar, the indications being four times repeated on the circumference of the disk, and the cam $g^7$ having in such case four instead of two steps. Electric connection is made with the electro-magnet H in any desired way—as, for instance, through binding screws mounted on a plate, $a^{16}$, (see Fig. 24,) of insulating material fixed to the outer plate of the frame carrying the working parts of the register.

The holders for containing checks or tokens of the check-delivery apparatus A, Fig. 1, are indicated at $a^6$. Any number of such check tubes or holders can be employed, and the different classes of checks can be placed in different tubes, being, if desired, mounted in a common case or in different cases, as desired.

The operating-handle of the mechanism by which the checks are ejected from their tubes or holders is indicated at $b^{16}$, Figs. 30 and 39. Connected also with the mechanism which requires to be moved in order to deliver from the boxes a check of any denomination are electric circuit-controlling devices consisting of one or more springs, $a^{10}$ $b^{10}$, (see Figs. 1, 30, and 39,) moving over contact-plates $d^{12}$ $e^{12}$. Any other desired form of circuit-controller may be used.

The action of the circuit-controlling devices upon the electric circuit is made different for different kinds of checks. In the case of the application of the invention herein described, where five and ten cent fares are collected and checks to correspond therewith are delivered, the action of the circuit-controlling devices is to be changed at certain hours in the day, and with an electric register of the kind already described the operation of the circuit-controlling devices should be such that when it is proper for ten-cent checks to be issued there will be two operations of the electro-magnet H for every operation of the check-ejecting mechanism, while during the time it is proper for the ticket-agent to deliver five-cent checks a single operation of the magnet will be produced.

Before describing more particularly the details of the check-ejecting mechanism I will describe the devices and arrangements of circuits, whereby the purposes just stated may be accomplished. The two springs $a^{10}$ $b^{10}$ are mounted upon a lever, $n^6$, which moves with the operating-lever $b^{16}$, through suitable mechanical connections therewith, to be presently described. The two springs are connected electrically in any desired way by attachment, for instance, of the circuit-wire to the frame carrying said lever through register $E^2$ (which, however, might be omitted) with the conductor 2, and one pole of the main battery M B at the central or supervising office. At each operation of the lever $b^{16}$ the two springs move, respectively, over the contact plates $d^{12}$ $e^{12}$, insulated from one another and separately connected with the other circuit-wire, 2, through devices by which the connection of either one at pleasure may be broken. The plate $d^{12}$ is so placed or is of such length that on a movement of the spring $a^{10}$, as just stated, said spring shall first make contact with the same, and, continuing its movement, shall break contact, and then, on a return movement to its first position, shall again make and break contact, thus producing two makes and breaks of circuits for one operation of the lever $b^{16}$. The spring and plate $a^{10}$ $d^{12}$ are to be connected so as to be operative in effecting the circuit of the main battery M B during the regular hours when ten-cent checks are in use. The spring $b^{10}$ moves over the plate $e^{12}$ of such length or so placed that the spring shall make contact with the plate, and shall remain in contact until, on its return movement, it reaches the point where it first made contact. In other words, this circuit-controller should be constructed to simply produce one make and break of circuit at each operation of the lever $b^{16}$. The plate $e^{12}$ should be connected into circuit during commission hours, and so that one operation of the magnet H shall be produced at each delivery of a five-cent check, thus moving the register-wheels forward one step only. The electro-magnet $d^7$, (see Fig. 39,) through which the latter plate, $e^{12}$, is connected to the circuit, has a special function in changing the indications of the register E, which is worked in any desired way through connection, mechanical or electrical, with the operating mechanism of the check-delivery apparatus. The branches 22 and 11 (of the circuit 2 2) leading to the plates $d^{12}$ $e^{12}$, respectively, may be connected to the circuit 2, either by hand or automatically by suitable clock-work controlling the operation of the switch. When a clock-work mechanism is employed, I prefer to use the arrangement of circuits and devices shown in Figs. 1, 16, and 17. The two branches 22 and 11, leading from the plates, connect, respectively, to springs $k^{10}$ $l^{10}$, and the latter bear at the proper times upon the curved conducting-segments $h^{10}$ $i^{10}$, which are in electrical connection with the wire 2, (see Fig. 1,) through attachment of the latter with the metallic frame-work carrying the wheel $g^{10}$, upon which the segment are mounted, or are connected with said wire through a spring, $a^{12}$, bearing on the shaft carrying the wheel $g^{10}$. (See Fig. 16.) A simple way of getting the desired movement of the two segments is to mount them upon the stop-wheel for a striking-clock arranged to strike the half and whole hours. Such a wheel is indicated at $g^{10}$, while $f^{10}$ indicates the stop-wire. As will be seen, one end of the segment $h^{10}$ terminates at or near the point where the wheel comes to rest on striking half-past four, and the other end at or near the point where the wheel comes to rest on striking half-past seven. (See Fig. 16.) The ends of the segment $i^{10}$ terminate at such points that on the raising of the stop-wire $f^{10}$ to permit the wheel $g^{10}$ to begin to move in the act of striking half-past four, the spring $h^{10}$ will come into contact with segment $i^{10}$, while spring $k^{10}$ will pass out of contact with segment $h^{10}$. The other ends of the two segments are suitably located, so that when the wheel begins to move at the time the striking mechanism is to strike the hour of half-past seven, the spring $h^{10}$ will leave its segment and the spring $k^{10}$ come into contact with its segment $h^{10}$. The period between the times mentioned includes what are known as the "afternoon commission hours" on the elevated roads of New York city. If the commission hours of the morning are different, thus requiring the segments to be differently placed for such period, the set of stop-teeth shown on wheel $g^{10}$ might be simply duplicated in continuance of the arrangement indicated, thus making a stop-wheel which would rotate once in twenty-four hours, the segments $h^{10}$ and $i^{1}$, or duplications of them, being suitably placed in obvious manner. The circuits and devices whereby these changes are produced are kept sealed up or out of the control of persons who might desire to tamper with them. It will be obvious that at certain hours, and by the automatic action of the clock mechanism F, the circuit-controlling devices which require to be operated in order that a check may be delivered, will be automatically governed or changed, so that whether a five or ten cent check be delivered the registry required to be made at a certain period will be made irrespective of the kind of check delivered or ejected. It therefore becomes under this particular arrangement incumbent upon the operator to simply bring the check-tubes into position where he can obtain the kind of check required. His failure to do so can avail him nothing, inasmuch as the registrations will be made according to the requirements of the case. It is of course to be understood that it is not within his power to deliver more than one check at a time, or at any rate deliver checks without producing a corresponding number of movements of the circuit-controlling devices.

The check-holding tubes and ejecting mechanism, together with the mechanism for operating the register E, will now be referred to more in detail. In Fig. 30 the check-holding tubes are shown as secured at their opposite ends in two rings or plates, $c^6$ $b^6$. The upper ends of the tubes are closed by plate $h^6$, that may be locked by any desired means, and may be opened only by persons having proper authority. The lower ring or plate, $c^6$, is capable of being revolved upon a base, $e^6$, so that the tubes carried by said base ring or plate $c^6$ can be moved at pleasure into coincidence with the ejecting slide or plate $g^6$, (see Figs. 35 and 36,) and as fast as the tubes are exhausted of checks, or when it is desired to obtain checks from a tube containing ten-cent checks at the termination of commission hours, or, vice versa, when it is desired to use five-cent checks at the beginning of commission hours. It is of course to be understood that the ring $c^6$ is combined with suitable appliances for preventing it from being detached from the base $e^6$. The lower ends of the tubes are closed by the bed-plate $d^6$, suitably mounted in the base $e^6$, but cut away at one certain point, $a^{17}$, Fig. 37, where the ejecting-slide $g^6$ works, and where, owing to the depression formed by the cut-away portion $a^{17}$, the checks may drop into an opening in the check-ejecting slide, which opening is clearly shown in Fig. 30. Normally the check-ejecting slide is in the position shown in such figure, and its outer end, $k^6$, closes the lower end of the check-tube that is for the time being in position for use. The opening in the check-ejecting slide, which opening is adapted to receive a check when one is to be withdrawn, is, with the parts in the position shown, over an opening, $f^6$, in the base-plate $d^6$. When the slide is moved to the right by the mechanism to be presently described, the opening in said slide is brought into coincidence with the lower end of the check-tube, and one of the checks drops into said opening and rests upon the bed-plate $d^6$ at the point where the slide works. But one check can drop, inasmuch as the thickness of the slide or the distance from the bottom of the depression $a^{17}$ to the edge of the check-tube is just the thickness of a check. On the backward movement of the ejector the check is brought to coincidence with the opening $f^6$, and drops through a suitable tube, $y$, so that it can be obtained. At the same time the end $k^6$ of the ejector closes the lower end of the check-tube. A device for holding the check-tubes successively in exact coincidence with the ejector is preferably employed. Such a device may be a spring, $b^{17}$, whose free end is adapted to enter grooves or notches $x^2$ (see Fig. 35) in the revoluble base-ring $c^6$. The spring itself is fixed to the base $e^6$. The operating-lever $b^{16}$ projects up from the casing containing the check-tubes, and is mounted on a suitable post or support, as shown, rising from the center of the base $e^6$. The inner end of the lever works against the upper end of the lever $n^6$, which has a suitable retractor, and said lever in turn operates upon a pin or projection carried by the upper end of the lever $i^6$, whose lower end connects by a link with the ejector-slide. The levers $i^6$ $n^6$ are mounted in a frame or support, $m^6$, that may be secured to the center post, or otherwise supported. The conducting-plates $d^{12}$ $e^{12}$ are also secured to the support $m^6$. The lever $n^6$ carries the springs $a^{10}$ $b^{10}$ of the circuit controlling devices already described. The upper end of lever $i^6$ carries an arm with a roller which bears against a lever, $o^6$, pivoted at its lower end in the frame $m^6$, or otherwise mounted, and engaging at its opposite or upper end with a horizontal lever, $p^6$, (see Fig. 31,) by which movement is communicated to the actuating-pawls of the register E. The indicating-disks of said register are preferably the same as those already described, and are indicated by the letters $a^8$ $b^8$ $c^8$. (See Fig. 31.) The mechanism of the register, excepting in certain details of the mechanism for operating the prime or units wheel, are the same as those already described in respect to the mounting of the disks, the carrying devices, &c. These latter details are here omitted for the sake of simplicity. The frame in which the parts of the register are mounted is indicated at $i^7$, (see Figs. 30 and 31,) said frame being suitably fastened to the center post or to any other suitable support. The lever $p^6$, Fig. 31, operates two actuating-pawls that engage with the units-wheel $f^7$, and moves the same, one after the other, during the period in which ten-cent checks are employed. These two actuating-pawls are indicated at $o^7$ $e^7$, (see Fig. 31,) respectively, and are carried by levers $w^6$ $v^6$, connected at $q^6$ with the end of lever $p^6$, that is at the opposite side of the fulcrum from the end with which the arm $o^6$ engages. The lever $w^6$ is connected by a link, $r^6$, with the actuating-lever $p^6$, and the lever $v^6$ is connected with lever $p^6$ by a link, $t^6$. When the lever $p^6$ is moved by the arm $o^6$, the pawl $o^7$ moves in a direction to turn the wheel one tooth, while, simultaneously, the pawl $e^7$ is moved back to engage with a new tooth. On the reverse movement of the lever $p^6$, under the action of a suitable retracting-spring, the pawl $e^7$ moves the wheel another tooth, while the pawl $o^7$ simply takes up a position ready for the next operation of the lever $p^6$. It is therefore obvious that each whole movement by the lever $p^6$, accomplished by a single operation of the operating-lever $b^{16}$, by which a check is obtained, will move the wheel $f^7$ forward two teeth, and will give an indication by the units-disk $a^8$ of ten cents instead of five, which would be the case if one only of the actuating-pawls $o^7$ $e^7$ operated upon the wheel.

In order that the proper registration may be made during the time that five-cent checks are employed and are delivered from the check-delivery apparatus, I combine with the actuating mechanism for the units-wheel a device whereby one of the actuating-pawls may be held out of engagement with the wheel and prevent it from moving the same when the lever $p^6$ is operated. Such a device consists of an electro-magnet, $d^7$, (see Figs. 30 and 31,) whose armature-lever carries one or more pins, $c^7$, between which the pawl $o^7$ is held. These pins should be applied in such way as not to interfere with the backward and forward movement of the pawl under the action of its lever $v^6$. A retractor (not shown) applied to the armature-lever $b^7$, Fig. 30, normally tends to hold the pawl $o^7$ in engagement with the wheel $f^7$, so that at every movement of lever $p^6$ the wheel will be moved forward two steps or teeth. If, however, at any time the electro-magnet $d^7$ is energized, thus pulling up its armature-lever $b^7$, the pawl $o^7$ will be at such instant held away from the wheel $f^7$, and a complete movement of the lever $p^6$ will result in a movement forward of the wheel $f^7$ one step only—that is to say, to an extent necessary to give an indication of five cents. It is apparent, therefore, that the electro-magnet $d^7$ should come into action or should be in action during the so-called "commission" hours, and this is effected by including said magnet, as shown, (see Figs. 1 and 39,) in the circuit from the longer of the two contact-blocks of the switch operated by lever $N^6$ to the segment $i^{10}$, through which circuit is closed at such time. When the circuit through $i^{10}$ and electro-magnet $d^7$ is broken, and that through the other branch containing the shorter plate $d^{12}$ is closed, each operation of the lever for the ejecting mechanism will produce two movements of the units-wheel, as is necessary, inasmuch as ten-cent checks are then in use. When the electric switch changes the circuit to the magnet $d^7$, the lever $p^6$ is operated as before; but as the spring $b^{10}$ comes into contact with plate $e^{12}$ at the very instant that the lever begins to move, and continues in contact during substantially the whole movement of said lever, the electro-magnet $d^7$ will be energized, and will remove the pawl $o^7$ from engagement with the wheel. The pawl $e^7$ will then move the wheel forward one tooth on the return movement of the lever $e^6$, and a corresponding movement will be produced on other registers in the circuit 2 2, owing to the make and break of circuit produced by the spring and plate $b^{10}$ $e^{12}$, which make and break produces a to-and-fro movement of the armature levers for the various electro-magnets H of the registers that may be in use.

The general operation of the apparatus may be briefly recapitulated as follows: The check-tubes $a^6$ are charged with checks of the various denominations required, checks of a single denomination only being placed in any one tube, and said tubes being, if desired, properly marked to indicate the kind of check inclosed. When the ticket or check seller receives a fare, he operates the lever of the check-ejecting mechanism, in order to obtain a check to deliver to the person paying the fare or entrance money. In so doing he mechanically operates his own register E, which register is sealed and out of his control. At the same time he operates the register at the central or supervising station C, and the two registers must obviously correspond or tally with one another. The register $E^2$ may be used for convenience sake, to enable the operator to see the condition of his own register E. If the apparatus is used for elevated roads, the switching into and out of circuit of the circuit-controlling devices in the apparatus A is performed automatically by the clock F, though it obviously might be performed at the central office by hand, or at any other desired point. The operation of this switch changes, as before described, the action of the mechanism which is connected with the check-ejecting apparatus, and operates, either mechanically or electrically, to produce indications in the various registers, so that a correct indication or registry may be kept of the amount of money received. The checks are taken by the passengers or other persons and dropped in the box B, where they pass through the tube or guideway $a^2$, already described, and in so doing operate a register or registers contained in said box, and, as already explained, are automatically classified, either by the employment of the two registers, or by the action of the directing flap or valve, or by any other desired mechanism. It is apparent that there must be a tally between the indications and conditions of the mechanism in box B and the registering devices and contents of check-tubes at the station A, as well as in the registrations observed at station C or the supervising-station. All of these devices work together in harmony to put an almost perfect check upon the peculation and dishonesty of persons engaged in receiving moneys for admission-fees to bridges, elevated roads, places of amusement, &c., or upon persons employed in any commercial operations where it is desired to put a check upon the dishonesty of employés. In any case it is only necessary to rearrange and modify, as may be desired, the combinations of apparatus and devices hereinbefore described, to suit the particular use.

I have herein used the term "circuit-controller." By that term I mean any device which can be employed to control an electric circuit so as to produce an action in an electro-magnet or other mechanism responsive to electric currents. The term "electric switch" is also a well-understood term in the electric art, and the construction of mechanism for producing the desired switching is a matter admitting of a great many variations, which need not be described in detail, inasmuch as a description of one form exemplifying the changes of circuit desired is sufficient to clearly show forth the principle of the invention.

What I claim as my invention is—

1. The combination, with an electric circuit and a step-by-step register located therein, of a circuit-controller provided with two or more fingers, each of which is adapted to operate the register a different number of steps, and means for rendering operative either finger at predetermined intervals.

2. The combination, with two or more check-holding boxes holding different classes of checks, of a common ejecting mechanism, two circuit-controlling devices governed thereby, and means for throwing said circuit-controllers into and out of circuit, as and for the purpose described.

3. The combination, with a check-delivery apparatus, of two sets of circuit-controlling devices connected with the operating mechanism thereof, a time mechanism, and an electric switch for throwing one set of circuit-closing devices out of and the other into action, and vice versa, at determinate times.

4. The combination, with a check-delivery apparatus and two sets of circuit-controlling devices, of a time mechanism for throwing one or the other set into circuit at specified times, an electric circuit connecting the said apparatus with a central office or supervising station, and an electric register or recorder at the latter station.

5. The combination, with a check-delivery apparatus provided with a register to show the number of checks issued, of two or more sets of circuit-controlling devices connected with the operating mechanism of said apparatus, a circuit governed by said devices and connected with a central or supervising station containing a register, and an electric switch for throwing the circuit-controlling devices into action in turn at specified times.

6. The combination, with a check-delivery apparatus, of two sets of circuit-controlling devices, one of which produces a closing and breaking of the circuit a greater number of times than the other, an electric switch for throwing one set of circuit-closing devices into and the other out of circuit, or vice versa, as required, and an electric register operated by current on the circuit controlled.

7. The combination, with a check-delivery apparatus provided with a register to show the number of checks or tokens issued, of two sets of impelling devices operating in succession and in the same direction on the register at every operation of the delivery mechanism, and an electro-magnet for throwing one set out of action at pleasure without affecting the operation of the other, as and for the purpose described.

8. The combination, with a check-delivery apparatus, substantially such as described, and the operating lever or mechanism thereof, of a registering mechanism actuated thereby, and having two impelling-pawls working in succession and in the same direction upon the units-wheel, an electro-magnet connected with one operating-pawl, and an electric switch whereby said magnet may be thrown into or out of circuit and the actuating-pawl may be controlled so that each operation of the delivery mechanism may produce a movement of the units-wheel forward one or two steps, as desired.

9. The combination, with the register and its two sets of actuating devices, of an electro-magnet connected with one set for throwing the same into or out of operative relation to the wheel actuated thereby without affecting the action of the other set, as and for the purpose described.

10. The combination, with the operating-lever and the two sets of actuating-pawls adapted to act successively and in the same direction on a register-wheel, of an electro-magnet connected with one set, and a switch for throwing said magnet into or out of action, as desired.

11. The combination, with the check-delivery apparatus and its operating-lever, of the two circuit closers and breakers, one of which has a contact-surface of reduced length, so that in a complete movement of the operating mechanism the circuit will be made and broken twice.

12. The combination, with a check-delivery apparatus and a check-receiving apparatus having an automatic register operated by the checks, of an electric switch and time mechanism for governing the circuits employed in registering checks of different denomination or character, substantially as set forth.

13. The combination, with a check-delivery apparatus containing two or more electric circuits or branches of circuits to be used in connection with the devices for registering checks of different denomination, of an electric switch controlling said circuit, as and for the purpose described.

14. The combination, with the check-delivery apparatus, of two sets of circuit-controlling devices, one of which makes and breaks the circuit twice as many times as the other, a circuit connecting said check-delivery apparatus with a central or supervising station, and an electric register whose magnet is included in the circuit at said station.

15. The combination, with a check-delivery apparatus, of a register operated thereby and an electro-magnet connected with said register for controlling its actuating mechanism, whereby the indications of the register under the operation of the delivery mechanism may be changed automatically, as and for the purpose described.

16. The combination, with the operating handle or arm for a check-delivery apparatus, of a register having mechanical connection with said mechanism, an electro-magnet whereby the mechanical action of the register under the operation of the mechanism may be changed at pleasure, and a switch for throwing said magnet into and out of circuit at pleasure.

17. The combination, in a check-receiving box, of a guideway or chute for the checks or tokens, a pivoted lever having an arm projecting into the path of the checks, and circuit-controlling contacts controlled by said lever.

18. The combination, with a register, of a guideway or chute adapted to carry or convey a number of objects or articles in succession, a spacing finger or stop, and devices controlled by the objects or articles in their passage through the guideway for operating said stop or finger so as to produce a space or interval between the successive objects as they pass through the chute, and operating or controlling devices for a register mechanism.

19. The combination, substantially as described, with a guideway or chute, of a stop or spacing finger and devices controlled by the objects passing through the chute or guideway for operating said finger so as to produce a space or interval between the successive objects 20. The combination, substantially as described, of a guideway or chute, a spacing finger or stop, an electro-magnet for throwing the same into engagement with objects passing through the chute, and a circuit-controller governing the action of said magnet and itself operated by the passing objects.

21. The combination, substantially as described, with a chute or guideway for checks, or their equivalent, as described, of a circuit-controller having an operating-arm projecting into the path of checks passing in the guideway, a spacing finger or stop arranged, as described, to engage with the check or coin succeeding that which is in engagement with the circuit-controller, whereby an interval between the checks or coins may be produced in their passage to operate said controller.

22. The combination, with the guideway or chute, of a circuit-controlling feeler and a circuit combined therewith and containing an electro-magnet for operating devices, whereby the different kinds of objects passing through the chute may be classified or enumerated, as described.

23. The combination, with a guideway or chute, of a circuit-controlling feeler, an electro-magnet for throwing the same into engagement with objects passing through the chute, and a circuit-controller governing the action of said magnet and operated by the passing objects.

24. The combination, with a guideway or chute, of two or more sets of spacing-stops, whereby the devices passing through the chute may be permitted to fall or move in succession, but with an interval between them, an operating electro-magnet for moving said stops, a circuit-controller operated by the objects passing through the guideway, a selecting feeler or finger, and an operating-magnet for the latter controlled by the circuit-controlling mechanism that brings into action the magnet for operating the spacing-stops.

25. The combination, with the guideway or chute, of a circuit-controlling feeler or finger whose two electrodes are carried, respectively, by a part moving with the finger itself, and by a part communicating motion to said finger through a flexible or extensible connection, so that when the feeler meets with an obstruction in the guideway the position of the electrodes of the controller with relation to one another will be changed.

26. The combination, with the guideway or chute, of a feeler for engaging with the objects passing through said guideway, and a stop for temporarily holding the objects in position opposite the feeler.

27. The combination, with the guideway or chute, of a circuit-controlling selecting-feeler, an electro-magnet for projecting said finger or feeler into the guideway, and a circuit-controller operated by the passage of objects through the chute for bringing said magnet into action.

28. The combination, with the guideway or chute, of a circuit-controlling feeler, an electro-magnet, and a guiding flap or valve in the passage to the receiving box or receptacle, whereby the objects passing through the guideway may be automatically classified or distributed.

29. The combination, with the guideway or chute, of a circuit-controller, a relay whose circuit, completed by the operation of said circuit-controller, is through the back contact for the relay, an electric register in a circuit completed through a front contact of the relay, and an electro-magnet brought into action by said magnet, when energized, for operating a circuit-controller, whereby the relay-magnet is de-energized.

30. The combination, with the chute or guideway, a circuit-controller, a relay actuated thereby, and a branch from the relay-circuit to a registering-magnet, of an artificial resistance in the relay-circuit, as and for the purpose described.

31. The combination, with a guideway or chute, of a spacing finger or stop, a circuit-controller operated by the objects passing through the guideway, an electro-magnet for operating the stop, and a relay controlling said magnet and having a flexible back contact in the circuit to the relay-coils closed by the operation of the circuit-controller.

32. The combination, with the guideway or chute, of a selecting finger or feeler carrying one electrode of a circuit-controller, a second electrode, the common actuating mechanism for both electrodes, and a flexible or elastic connection permitting a movement of the second electrode to bring it into contact with the first when the feeler or finger carrying the latter engages with any object in the guideway or chute.

33. The combination, with the guideway or chute, of a circuit-controlling feeler, a detaining-stop for holding objects passing through the chute in position opposite the selecting finger or feeler, and an electro-magnet for removing said stop, said magnet being controlled in its action by a circuit-controller operated by the objects passing through the chute or guideway.

34. The combination, with the chute or guideway, of a circuit-controller, an electric register governed thereby, a detaining stop or finger in position normally to stop or hold objects passing through the chute at a point where they will operate upon the circuit-controller, and an electro-magnet for removing said stop, said electro-magnet being brought into action by a circuit-controller located at the point where the moving object is brought to rest, so that after stoppage and registry the object may be permitted to pass on.

35. The combination, in a check-receiving box, of a guideway or chute, a circuit-controller governed by the passage of objects through the chute, and a stop or detaining device for temporarily holding the checks at the point opposite the circuit-controller.

36. The combination, in a check-receiving box, of a guideway or chute, a circuit-controller, a stop or detent for holding the check temporarily in position opposite the circuit-controller, and an electro-magnet for removing the stop, said electro-magnet being governed by the action of said circuit-controller in closing or opening an electric circuit.

37. The combination, in a check-receiving box, of a guideway or chute, a circuit-controller, an electric register, and a stop or detaining device for temporarily holding the checks at a point where they engage with and operate the circuit-controller, as and for the purpose described.

38. The combination, with the check-delivery apparatus, of sets of circuit-controlling devices that make and break a circuit a different number of times, respectively, a central or supervising station electrically connected with the ticket-delivery apparatus, and an electric register operated or controlled by the circuit-controlling devices connected with the check-delivery apparatus.

Signed at New York, in the county of New York and State of New York, this 15th day of February, A. D. 1886.

J. H. GUEST.

Witnesses:
WM. H. CAPEL,
GEO. C. COFFIN.